(12) United States Patent
Inoue et al.

(10) Patent No.: US 9,108,154 B2
(45) Date of Patent: *Aug. 18, 2015

(54) EXHAUST PURIFICATION SYSTEM OF INTERNAL COMBUSTION ENGINE

(75) Inventors: Mikio Inoue, Susono (JP); Kohei Yoshida, Gotenba (JP); Yuki Bisaiji, Mishima (JP); Kazuhiro Umemoto, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/264,594

(22) PCT Filed: Dec. 20, 2010

(86) PCT No.: PCT/JP2010/073645
§ 371 (c)(1),
(2), (4) Date: Oct. 14, 2011

(87) PCT Pub. No.: WO2012/086093
PCT Pub. Date: Jun. 28, 2012

(65) Prior Publication Data
US 2013/0259753 A1 Oct. 3, 2013

(51) Int. Cl.
*F01N 3/10* (2006.01)
*F01N 3/00* (2006.01)
(Continued)

(52) U.S. Cl.
CPC ........ *B01D 53/9431* (2013.01); *B01D 53/9495* (2013.01); *F01N 3/0814* (2013.01); *F01N 3/0871* (2013.01); *F01N 3/208* (2013.01); *F01N 13/009* (2014.06); *F01N 2610/03* (2013.01); *F01N 2900/0422* (2013.01); *F01N 2900/0601* (2013.01); *F01N 2900/08* (2013.01);
(Continued)

(58) Field of Classification Search
None
See application file for complete search history.

(56) References Cited

U.S. PATENT DOCUMENTS

| 5,052,178 A | 10/1991 | Clerc et al. |
| 5,057,483 A | 10/1991 | Wan |

(Continued)

FOREIGN PATENT DOCUMENTS

| CN | 101454081 A | 6/2009 |
| CN | 101600860 A | 12/2009 |

(Continued)

OTHER PUBLICATIONS

U.S. Appl. No. 13/582,862, filed Sep. 5, 2012 in the name of Uenishi et al.

(Continued)

*Primary Examiner* — Walter D Griffin
*Assistant Examiner* — Jelitza Perez
(74) *Attorney, Agent, or Firm* — Oliff PLC

(57) ABSTRACT

In an internal combustion engine, inside of an engine exhaust passage, a hydrocarbon feed valve (15) and an exhaust purification catalyst (13) are arranged. At the time of engine operation, the amplitude of change of the concentration of hydrocarbons which flow into the exhaust purification catalyst (13) is made to become within a predetermined range of amplitude by control of at least one of the injection time and injection pressure of hydrocarbons from the hydrocarbon feed valve (15). In this case, when only the injection time of hydrocarbons is controlled, the injection time of hydrocarbons under the same engine operating state is made longer the higher the temperature of the exhaust purification catalyst (13).

9 Claims, 26 Drawing Sheets

(51) Int. Cl.

| | | |
|---|---|---|
| *F01N 9/00* | (2006.01) | |
| *B01D 53/94* | (2006.01) | |
| *F01N 3/20* | (2006.01) | |
| *F01N 3/08* | (2006.01) | |
| *F01N 13/00* | (2010.01) | |

(52) U.S. Cl.
CPC . *F01N2900/1402* (2013.01); *F01N 2900/1602* (2013.01); *F01N 2900/1808* (2013.01); *F01N 2900/1812* (2013.01); *Y02T 10/24* (2013.01)

(56) References Cited

U.S. PATENT DOCUMENTS

| | | | |
|---|---|---|---|
| 5,075,274 | A | 12/1991 | Kiyohide et al. |
| 5,402,641 | A | 4/1995 | Katoh et al. |
| 5,882,607 | A | 3/1999 | Miyadera et al. |
| 6,109,024 | A | 8/2000 | Kinugasa et al. |
| 6,327,851 | B1 | 12/2001 | Bouchez et al. |
| 6,413,483 | B1 | 7/2002 | Brisley et al. |
| 6,477,834 | B1 | 11/2002 | Asanuma et al. |
| 6,667,018 | B2 | 12/2003 | Noda et al. |
| 6,813,882 | B2 | 11/2004 | Hepburn et al. |
| 6,854,264 | B2 | 2/2005 | Elwart et al. |
| 6,877,311 | B2 | 4/2005 | Uchida |
| 6,983,589 | B2 | 1/2006 | Lewis et al. |
| 7,063,642 | B1 | 6/2006 | Hu et al. |
| 7,073,325 | B2 | 7/2006 | Nakatani et al. |
| 7,082,753 | B2 | 8/2006 | Dalla Betta et al. |
| 7,111,456 | B2 | 9/2006 | Yoshida et al. |
| 7,137,379 | B2 | 11/2006 | Sasaki et al. |
| 7,146,800 | B2 | 12/2006 | Toshioka et al. |
| 7,165,393 | B2 | 1/2007 | Betta et al. |
| 7,299,625 | B2 | 11/2007 | Uchida et al. |
| 7,332,135 | B2 | 2/2008 | Gandhi et al. |
| 7,412,823 | B2 | 8/2008 | Reuter et al. |
| 7,454,900 | B2 | 11/2008 | Hayashi |
| 7,484,504 | B2 | 2/2009 | Kato et al. |
| 7,506,502 | B2 | 3/2009 | Nakano et al. |
| 7,549,284 | B2 | 6/2009 | Iihoshi et al. |
| 7,703,275 | B2 | 4/2010 | Asanuma et al. |
| 7,707,821 | B1 | 5/2010 | Legare |
| 7,861,516 | B2 | 1/2011 | Allansson et al. |
| 8,099,950 | B2 | 1/2012 | Kojima et al. |
| 8,215,101 | B2 | 7/2012 | Tsujimoto et al. |
| 8,261,532 | B2 | 9/2012 | Fukuda et al. |
| 8,281,569 | B2 | 10/2012 | Handa et al. |
| 8,434,296 | B2 | 5/2013 | Wada et al. |
| 8,572,950 | B2 | 11/2013 | Bisaiji et al. |
| 8,656,706 | B2 | 2/2014 | Umemoto et al. |
| 8,671,667 | B2 | 3/2014 | Bisaiji et al. |
| 8,679,410 | B2 | 3/2014 | Umemoto et al. |
| 8,689,543 | B2 | 4/2014 | Numata et al. |
| 8,695,325 | B2 | 4/2014 | Bisaiji et al. |
| 2001/0052232 | A1 | 12/2001 | Hoffmann et al. |
| 2002/0029564 | A1 | 3/2002 | Roth et al. |
| 2002/0053202 | A1 | 5/2002 | Akama et al. |
| 2003/0010020 | A1 | 1/2003 | Taga et al. |
| 2003/0040432 | A1 | 2/2003 | Beall et al. |
| 2003/0101713 | A1 | 6/2003 | Betta et al. |
| 2004/0045285 | A1 | 3/2004 | Penetrante et al. |
| 2004/0050037 | A1 | 3/2004 | Betta et al. |
| 2004/0055285 | A1 | 3/2004 | Rohr et al. |
| 2004/0154288 | A1 | 8/2004 | Okada et al. |
| 2004/0175305 | A1 | 9/2004 | Nakanishi et al. |
| 2004/0187477 | A1 | 9/2004 | Okugawa et al. |
| 2005/0135977 | A1 | 6/2005 | Park et al. |
| 2005/0147541 | A1 | 7/2005 | Ajisaka et al. |
| 2006/0053778 | A1 | 3/2006 | Asanuma et al. |
| 2006/0107657 | A1 | 5/2006 | Bernler et al. |
| 2006/0153761 | A1 | 7/2006 | Bandl-Konrad et al. |
| 2006/0286012 | A1 | 12/2006 | Socha et al. |
| 2007/0016357 | A1 | 1/2007 | Nakagawa et al. |
| 2007/0028601 | A1 | 2/2007 | Duvinage et al. |
| 2007/0059223 | A1 | 3/2007 | Golunski et al. |
| 2007/0089403 | A1 | 4/2007 | Pfeifer et al. |
| 2007/0125073 | A1 | 6/2007 | Reuter |
| 2007/0151232 | A1 | 7/2007 | Dalla Betta et al. |
| 2008/0022662 | A1 | 1/2008 | Yan |
| 2008/0053073 | A1 | 3/2008 | Kalyanaraman et al. |
| 2008/0102010 | A1 | 5/2008 | Bruck et al. |
| 2008/0120963 | A1 | 5/2008 | Morita et al. |
| 2008/0148711 | A1 | 6/2008 | Takubo |
| 2008/0154476 | A1 | 6/2008 | Takubo |
| 2008/0196398 | A1 | 8/2008 | Yan |
| 2008/0223020 | A1 | 9/2008 | Yoshida et al. |
| 2008/0276602 | A1 | 11/2008 | McCabe et al. |
| 2009/0000277 | A1 | 1/2009 | Yoshida et al. |
| 2009/0049824 | A1 | 2/2009 | Kojima et al. |
| 2009/0049825 | A1 | 2/2009 | Ohashi |
| 2009/0049826 | A1 | 2/2009 | Toshioka et al. |
| 2009/0077948 | A1 | 3/2009 | Mondori et al. |
| 2009/0084091 | A1 | 4/2009 | Tsujimoto et al. |
| 2009/0118121 | A1 | 5/2009 | Sarai |
| 2009/0120072 | A1 | 5/2009 | Dalla Betta et al. |
| 2009/0151332 | A1 | 6/2009 | Toshioka et al. |
| 2009/0191108 | A1 | 7/2009 | Blanchard et al. |
| 2009/0196811 | A1 | 8/2009 | Yamashita et al. |
| 2009/0229251 | A1 | 9/2009 | Kadowaki |
| 2009/0249768 | A1 | 10/2009 | Asanuma et al. |
| 2009/0266057 | A1 | 10/2009 | Tsujimoto et al. |
| 2009/0282809 | A1 | 11/2009 | Toshioka |
| 2009/0288393 | A1 | 11/2009 | Matsuno et al. |
| 2009/0313970 | A1 | 12/2009 | Iida |
| 2010/0005873 | A1 | 1/2010 | Katoh et al. |
| 2010/0055012 | A1 | 3/2010 | Grisstede et al. |
| 2010/0107613 | A1 | 5/2010 | Masuda et al. |
| 2010/0115923 | A1 | 5/2010 | Tsujimoto et al. |
| 2010/0126148 | A1 | 5/2010 | Morishima et al. |
| 2010/0132356 | A1 | 6/2010 | Lee |
| 2010/0154387 | A1 | 6/2010 | Shibata et al. |
| 2010/0233051 | A1 | 9/2010 | Grisstede et al. |
| 2010/0236224 | A1 | 9/2010 | Kumar et al. |
| 2010/0242459 | A1 | 9/2010 | Tsujimoto et al. |
| 2011/0041486 | A1 | 2/2011 | Kato et al. |
| 2011/0047984 | A1 | 3/2011 | Lee et al. |
| 2011/0047988 | A1 | 3/2011 | Lewis et al. |
| 2011/0113754 | A1 | 5/2011 | Kohara et al. |
| 2011/0120100 | A1 | 5/2011 | Yin et al. |
| 2011/0131952 | A1 | 6/2011 | Onodera et al. |
| 2011/0173950 | A1 | 7/2011 | Wan et al. |
| 2011/0209459 | A1 | 9/2011 | Hancu et al. |
| 2012/0122660 | A1 | 5/2012 | Andersen et al. |
| 2012/0124967 | A1 | 5/2012 | Yang et al. |
| 2012/0124971 | A1 | 5/2012 | Bisaiji et al. |
| 2012/0131908 | A1 | 5/2012 | Bisaiji et al. |
| 2013/0000284 | A1 | 1/2013 | Bisaiji et al. |
| 2013/0011302 | A1 | 1/2013 | Bisaiji et al. |
| 2013/0022512 | A1 | 1/2013 | Bisaiji et al. |

FOREIGN PATENT DOCUMENTS

| | | |
|---|---|---|
| EP | 1 033 479 A2 | 9/2000 |
| EP | 1 273 337 A1 | 1/2003 |
| EP | 1 371 415 A1 | 12/2003 |
| EP | 1 519 015 A2 | 3/2005 |
| EP | 1544429 A1 | 6/2005 |
| EP | 1 710 407 A1 | 10/2006 |
| EP | 1 793 099 A1 | 6/2007 |
| EP | 1 911 506 A1 | 4/2008 |
| EP | 1 936 164 A1 | 6/2008 |
| EP | 1 965 048 A1 | 9/2008 |
| EP | 2 063 078 A1 | 5/2009 |
| EP | 2 149 684 A1 | 2/2010 |
| EP | 2 239 432 | 10/2010 |
| EP | 2 460 989 A1 | 6/2012 |
| JP | A-04-200637 | 7/1992 |
| JP | A-H08-117601 | 5/1996 |
| JP | A-09-004437 | 1/1997 |
| JP | A-09-220440 | 8/1997 |
| JP | A-11-30117 | 2/1999 |
| JP | A-11-62559 | 3/1999 |
| JP | A-11-081994 | 3/1999 |
| JP | A-2000-257419 | 9/2000 |
| JP | A-2002-188429 | 7/2002 |

(56) References Cited

FOREIGN PATENT DOCUMENTS

| JP | A-2004-016850 | 1/2004 |
|---|---|---|
| JP | A-2004-36543 | 2/2004 |
| JP | A-2004-216224 | 8/2004 |
| JP | A-2004-290965 | 10/2004 |
| JP | A-2004-308526 | 11/2004 |
| JP | A-2004-316458 | 11/2004 |
| JP | A-2005-61340 | 3/2005 |
| JP | A-2005-113801 | 4/2005 |
| JP | A-2005-171853 | 6/2005 |
| JP | A-2005-177738 | 7/2005 |
| JP | A-2006-501390 | 1/2006 |
| JP | A-2006-512529 | 4/2006 |
| JP | A-2006-342700 | 12/2006 |
| JP | A-2007-064167 | 3/2007 |
| JP | A-2007-514090 | 5/2007 |
| JP | A-2007-514104 | 5/2007 |
| JP | A-2007-154794 | 6/2007 |
| JP | B2-3969450 | 9/2007 |
| JP | A-2007-278120 | 10/2007 |
| JP | A-2008-002451 | 1/2008 |
| JP | A-2008-19760 | 1/2008 |
| JP | A-2008-69769 | 3/2008 |
| JP | A-2008-231926 | 10/2008 |
| JP | A-2008-232003 | 10/2008 |
| JP | A-2008-255858 | 10/2008 |
| JP | A-2008-267178 | 11/2008 |
| JP | A-2008-267217 | 11/2008 |
| JP | A-2008-286186 | 11/2008 |
| JP | A-2008-543559 | 12/2008 |
| JP | A-2009-30560 | 2/2009 |
| JP | A-2009-112967 | 5/2009 |
| JP | A-2009-114879 | 5/2009 |
| JP | A-2009-156067 | 7/2009 |
| JP | A-2009-165922 | 7/2009 |
| JP | A-2009-167973 | 7/2009 |
| JP | A-2009-168031 | 7/2009 |
| JP | A-2009-191823 | 8/2009 |
| JP | A-2009-221939 | 10/2009 |
| JP | A-2009-226349 | 10/2009 |
| JP | A-2009-243362 | 10/2009 |
| JP | A-2009-275631 | 11/2009 |
| JP | A-2009-275666 | 11/2009 |
| JP | A-2010-012459 | 1/2010 |
| JP | A-2010-048134 | 3/2010 |
| JP | A-2011-190803 | 9/2011 |
| JP | B1-4868097 | 2/2012 |
| WO | WO 2005/059324 | 6/2005 |
| WO | WO 2006/131825 | 12/2006 |
| WO | WO 2007/026229 | 3/2007 |
| WO | WO 2007/141638 | 12/2007 |
| WO | WO 2008/007810 | 1/2008 |
| WO | WO 2008/012653 | 1/2008 |
| WO | WO 2009/016822 | 2/2009 |
| WO | WO 2009/056958 | 5/2009 |
| WO | WO 2009/082035 | 7/2009 |
| WO | WO 2011/114499 A1 | 9/2011 |
| WO | WO 2011/114501 A1 | 9/2011 |
| WO | WO 2011/118044 A1 | 9/2011 |

OTHER PUBLICATIONS

U.S. Appl. No. 13/375,674, filed Dec. 1, 2011 in the name of Inoue et al.
Office Action dated Mar. 28, 2014 issued in U.S. Appl. No. 13/582,862.
Office Action dated May 8, 2014 issued in U.S. Appl. No. 13/375,674.
Aug. 13, 2013 International Preliminary Report on Patentability issued in International Patent Application No. PCT/JP2011/053429 (with translation).
Aug. 8, 2013 Office Action issued in U.S. Appl. No. 13/258,483.
Feb. 6, 2014 Corrected Notice of Allowability issued in U.S. Appl. No. 13/202,694.
Mar. 22, 2011 International Search Report issued in International Patent Application No. PCT/JP2010/073645 (with translation).
Dec. 21, 2010 International Search Report issued in International Patent Application No. PCT/JP2010/065449 (with translation).
Dec. 27, 2011 International Search Report issued in International Patent Application No. PCT/JP2011/075618 (with translation).
Jun. 15, 2010 International Search Report issued in International Patent Application No. PCT/JP2010/054730 (with translation).
Nov. 22, 2010 International Search Report issued in International Patent Application No. PCT/JP2010/065186 (with translation).
Jan. 18, 2011 International Search Report issued in International Patent Application No. PCT/JP2010/067705.
Jan. 18, 2011 International Search Report issued in International Application No. PCT/JP2010/067707.
Jan. 18, 2011 International Search Report issued in International Patent Application No. PCT/JP2010/068785.
Jul. 14, 2014 Office Action issued in U.S. Appl. No. 13/262,001.
Jul. 14, 2014 Office Action issued in U.S. Appl. No. 13/264,884.
Jun. 16, 2014 Office Action issued in U.S. Appl. No. 13/581,186.
Jun. 18, 2014 Office Action issued in U.S. Appl. No. 13/582,909.
Jun. 21, 2011 International Search Report issued in International Patent Application No. PCT/JP2011/059880 (with English translation).
Jun. 23, 2014 Office Action issued in U.S. Appl. No. 13/262,858.
Jun. 26, 2014 Office Action issued in U.S. Appl. No. 13/580,000.
Jun. 29, 2010 International Search Report issued in International Patent Application No. PCT/JP2010/055303 (with translation).
Mar. 15, 2011 International Search Report issued in International Patent Application No. PCT/JP2011/053429 (with translation).
Mar. 22, 2011 International Search Report issued in International Patent Application No. PCT/JP2010/072299 (with translation).
Mar. 8, 2011 International Search Report issued in International Patent Application No. PCT/JP2011/052969 (with translation).
May 15, 2013 Office Action in U.S. Appl. No. 13/202,694.
May 17, 2011 International Search Report issued in International Patent Application No. PCT/JP2011/057264 (with translation).
May 2, 2014 Office Action issued in U.S. Appl. No. 13/263,660.
Mar. 4, 2014 Notice of Allowance issued in U.S. Appl. No. 13/255,786.
Nov. 13, 2013 Notice of Allowance issued in U.S. Appl. No. 13/202,692.
Oct. 17, 2013 Notice of Allowance issued in U.S. Appl. No. 13/202,694.
Nov. 22, 2010 International Search Report issued in International Patent Application No. PCT/JP2010/065187.
Nov. 26, 2012 Office Action issued in U.S. Appl. No. 13/202,694.
Oct. 26, 2010 International Search Report issued in International Patent Application No. PCT/JP2010/063135.
Oct. 26, 2012 Office Action issued in U.S. Appl. No. 13/202,692.
Oct. 23, 2013 Office Action issued in U.S. Appl. No. 13/263,272.
Apr. 23, 2014 Office Action issued in U.S. Appl. No. 13/260,986.
Apr. 3, 2014 Office Action issued in U.S. Appl. No. 13/259,574.
Dec. 20, 2013 Office Action issued in U.S. Appl. No. 13/264,230.
Jul. 1, 2014 Office Action issued in U.S. Appl. No. 13/257,789.
Jul. 24, 2013 Office Action issued in U.S. Appl. No. 13/202,692.
May 7, 2014 Office Action issued in U.S. Appl. No. 13/264,062.
U.S. Appl. No. 13/202,692 in the name of Umemoto et al., filed Sep. 20, 2011.
U.S. Appl. No. 13/202,733 in the name of Bisaui et al., filed Sep. 30, 2011.
U.S. Appl. No. 13/257,789 in the name of Nishioka et al., filed Oct. 14, 2011.
U.S. Appl. No. 13/258,483 in the name of Numata et al., filed Sep. 22, 2011.
U.S. Appl. No. 13/259,574 in the name of Tsukamoto et al., filed Sep. 23, 2011.
U.S. Appl. No. 13/259,885 in the name of Umemoto et al., filed Sep. 23, 2011.
U.S. Appl. No. 13/260,986 in the name of Watanabe et al., filed Sep. 29, 2011.
U.S. Appl. No. 13/262,858 in the name of Bisaiji et al., filed Oct. 4, 2011.
U.S. Appl. No. 13/263,272 in the name of Bisaiji et al., filed Oct. 6, 2011.

(56) References Cited

OTHER PUBLICATIONS

U.S. Appl. No. 13/263,660 in the name of Umemoto et al., filed Oct. 7, 2011.
U.S. Appl. No. 13/264,062 in the name of Watanabe et al., filed Oct. 12, 2011.
U.S. Appl. No. 13/264,230 in the name of Bisadi et al., filed Oct. 13, 2011.
U.S. Appl. No. 13/264,884 in the name of Bisaiji et al., filed Oct. 17, 2011.
U.S. Appl. No. 13/578,148 in the name of Umemoto et al., filed Aug. 9, 2012.
U.S. Appl. No. 13/58,186 in the name of Kazuhiro Umemoto et al., filed Aug. 24, 2012.
U.S. Appl. No. 13/580,000 in the name of Bisaiji et al., filed Aug. 20, 2012.
U.S. Appl. No. 13/582,909 in the name of Kazuhiro Umemoto et al., filed Sep. 5, 2012.
U.S. Appl. No. 13/202,694 in the name of Bisaui et al., filed Sep. 19, 2011.
U.S. Appl. No. 14/108,113 in the name of Bisaiji et al., filed Dec. 16, 2013.
U.S. Appl. No. 14/152,629 in the name of Umemoto et al., filed Jan. 10, 2014.
U.S. Appl. No. 13/262,001 in the name of Inoue et al., filed Oct. 19, 2011.
Nov. 22, 2010 Written Opinion issued in International Patent Application No. PCT/JP2010/065186 (with translation).
Dec. 27, 2011 Written Opinion issued in International Patent Application No. PCT/JP2011/075618.
Aug. 6, 2014 Notice of Allowance in U.S. Appl. No. 13/259,574.
Nov. 27, 2013 Notice of Allowance issued in U.S. Appl. No. 13/258,483.
Oct. 4, 2013 Notice of Allowance issued in U.S. Appl. No. 13/259,885.
Jun. 15, 2010 International Search Report issued in PCT/JP2010/054740 (with translation).
Jun. 15, 2010 Written Opinion issued in PCT/JP2010/054740 (with translation).
Jun. 20, 2012 Search Report issued in European Patent Application No. 10845966.0.
Jun. 15, 2010 International Search Report issued in International Application No. PCT/JP2010/054731 (with translation).
Jun. 29, 2010 International Search Report issued in International Patent Application No. PCT/JP2010/056345.
Apr. 4, 2013 Office Action issued in U.S. Appl. No. 13/255,710.
U.S. Appl. No. 13/255,774 in the name of Bisaiji et al., filed Sep. 22, 2011.
U.S. Appl. No. 13/255,710 in the name of Bisaiji et al., filed Oct. 12, 2011.
Oct. 24, 2013 Office Action issued in U.S. Appl. No. 13/255,710.
Jan. 17, 2013 Office Action issued in U.S. Appl. No. 13/202,733.
International Search Report dated Jun. 15, 2010 in International Application No. PCT/JP2010/054729
International Search Report issued in International Application No. PCT/JP2011/066628 dated Sep. 13, 2011 (with translation).
U.S. Appl. No. 13/502,210 in the name of Bisaiji et al., filed on Apr. 16, 2012.
U.S. Appl. No. 13/499,211 in the name of Bisaiji et al., filed Mar. 29, 2012.
Jan. 22, 2014 Office Action issued in U.S. Appl. No. 13/499,211.
May 27, 2014 Office Action issued in U.S. Appl. No. 13/255,710.
Sep. 18, 2014 Notice of Allowance issued in U.S. Appl. No. 13/255,710.
U.S. Appl. No. 13/934,080 in the name of Bisaiji et al., filed Jul. 2, 2013.
Oct. 2, 2014 Office Action issued in U.S. Appl. No. 13/582,862.
Jul. 9, 2013 Notice of Allowance issued in U.S. Appl. No. 13/255,774.
Dec. 9, 2013 Notice of Allowance issued m U.S. Appl. No. 13/262,506.
Dec. 27, 2013 Notice of Allowance issued in U.S. Appl. No. 13/502,210.
U.S. Appl. No. 13/262,506 in the name of Bisaiji et al., filed Sep. 30, 2011.
U.S. Appl. No. 13/264,230 in the name of Bisaiji et al., filed Oct. 13. 2011.
U.S. Appl. No. 13/202,694 in the name of Bisaiji et al., filed Sep. 19, 2011.
U.S. Appl. No, 13/202,733 in the name of Bisaiji et al., filed Sep. 30, 2011.
Dec. 22, 2014 Office Action issued in U.S. Appl. No. 13/264,230.
Jun. 3, 2015 Office Action issued in U.S. Appl. No. 14/152,629.

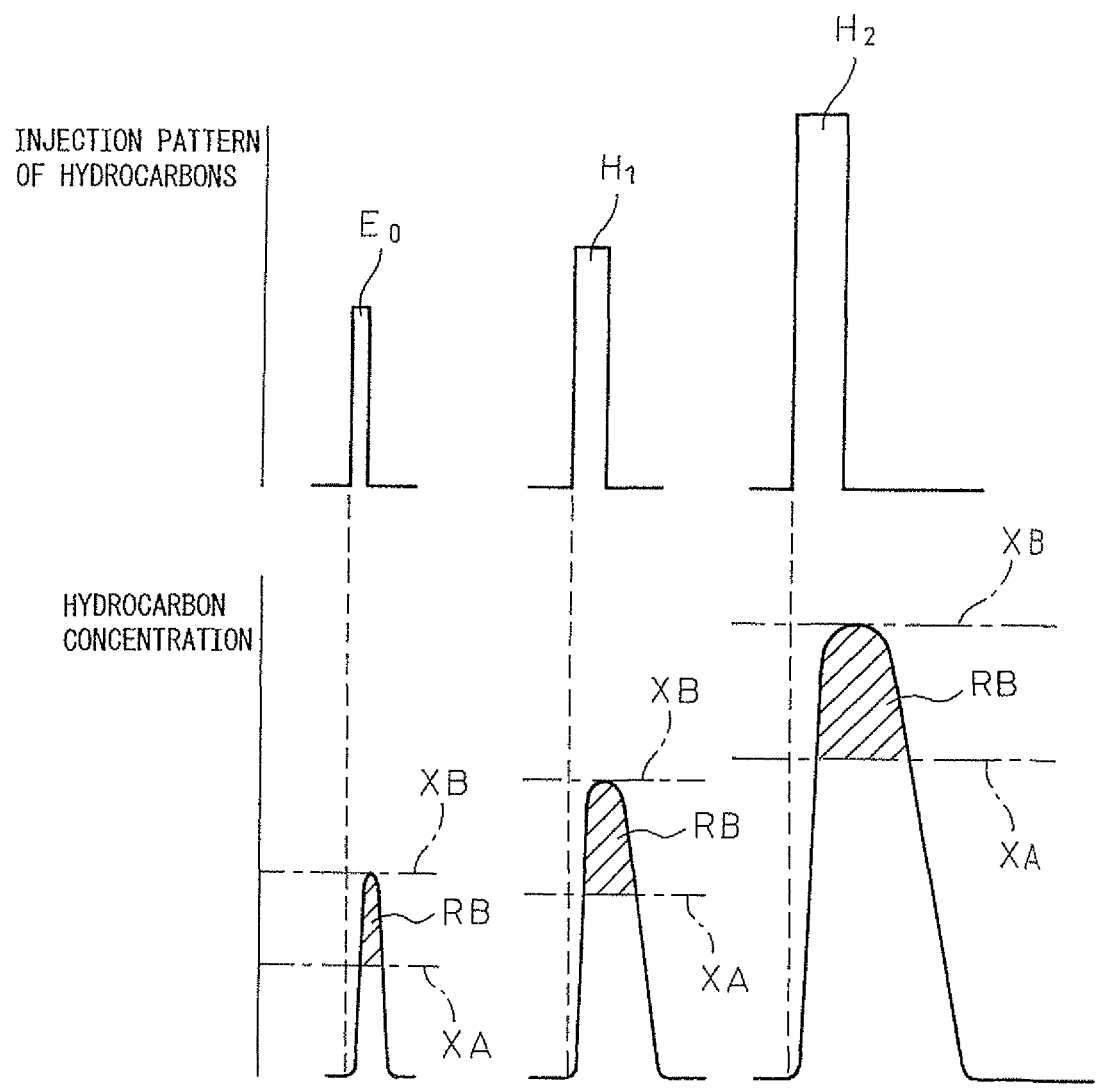

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges, in an engine exhaust passage, an $NO_x$ storage catalyst which stores $NO_x$ which is contained in exhaust gas when the air-fuel ratio of the inflowing exhaust gas is lean and which releases the stored $NO_x$ when the air-fuel ratio of the inflowing exhaust gas becomes rich, which arranges, in the engine exhaust passage upstream of the $NO_x$ storage catalyst, an oxidation catalyst which has an adsorption function, and which feeds hydrocarbons into the engine exhaust passage upstream of the oxidation catalyst to make the air-fuel ratio of the exhaust gas flowing into the $NO_x$ storage catalyst rich when releasing $NO_x$ from the $NO_x$ storage catalyst (for example, see Patent Literature 1).

In this internal combustion engine, the hydrocarbons which are fed when releasing $NO_x$ from the $NO_x$ storage catalyst are made gaseous hydrocarbons at the oxidation catalyst, and the gaseous hydrocarbons are fed to the $NO_x$ storage catalyst. As a result, the $NO_x$ which is released from the $NO_x$ storage catalyst is reduced well.

CITATION LIST

Patent Literature

Patent Literature 1: Japanese Patent No. 3969450

SUMMARY OF INVENTION

Technical Problem

However, there is the problem that when the $NO_x$ storage catalyst becomes a high temperature, the $NO_x$ purification rate falls.

An object of the present invention is to provide an exhaust purification system of an internal combustion engine which can obtain a high $NO_x$ purification rate even if the temperature of the exhaust purification catalyst becomes a high temperature.

Solution to Problem

According to the present invention, there is provided an exhaust purification system of an internal combustion engine in which a hydrocarbon feed valve for feeding hydrocarbons is arranged inside of an engine exhaust passage, an exhaust purification catalyst for reacting $NO_x$ contained in exhaust gas and reformed hydrocarbons is arranged inside of the engine exhaust passage downstream of the hydrocarbon feed valve, a precious metal catalyst is carried on an exhaust gas flow surface of the exhaust purification catalyst and a basic exhaust gas flow surface part is formed around the precious metal catalyst, the exhaust purification catalyst has a property of reducing the $NO_x$ which is contained in exhaust gas if a concentration of hydrocarbons flowing into the exhaust purification catalyst is made to vibrate within a predetermined range of amplitude and within a predetermined range of period and has a property of being increased in storage amount of $NO_x$ which is contained in exhaust gas if the vibration period of the hydrocarbon concentration is made longer than the predetermined range, and, at the time of engine operation, at least one of an injection time and injection pressure of hydrocarbons from the hydrocarbon feed valve is controlled so that the amplitude of the change of concentration of hydrocarbons flowing into the exhaust purification catalyst becomes within the above-mentioned predetermined range of amplitude, an injection period of hydrocarbons from the hydrocarbon feed valve is controlled so that the concentration of hydrocarbons flowing into the exhaust purification catalyst vibrates by within the above-mentioned predetermined range of period, when only the injection time of hydrocarbons is controlled, the injection time of hydrocarbons under the same engine operating state is made longer the higher a temperature of the exhaust purification catalyst, and when the injection pressure of hydrocarbons is controlled, the injection pressure of hydrocarbons under the same engine operating state is made higher the higher the temperature of the exhaust purification catalyst.

Advantageous Effects of Invention

Even if the temperature of the exhaust purification catalyst becomes a high temperature, a high $NO_x$ purification rate can be obtained.

BRIEF DESCRIPTION OF DRAWINGS

FIG. 31 is a view showing changes of an injection pattern of hydrocarbons from a hydrocarbon feed valve and a hydrocarbon concentration in the exhaust gas flowing into the exhaust purification catalyst.

DESCRIPTION OF EMBODIMENTS

Figure 1:
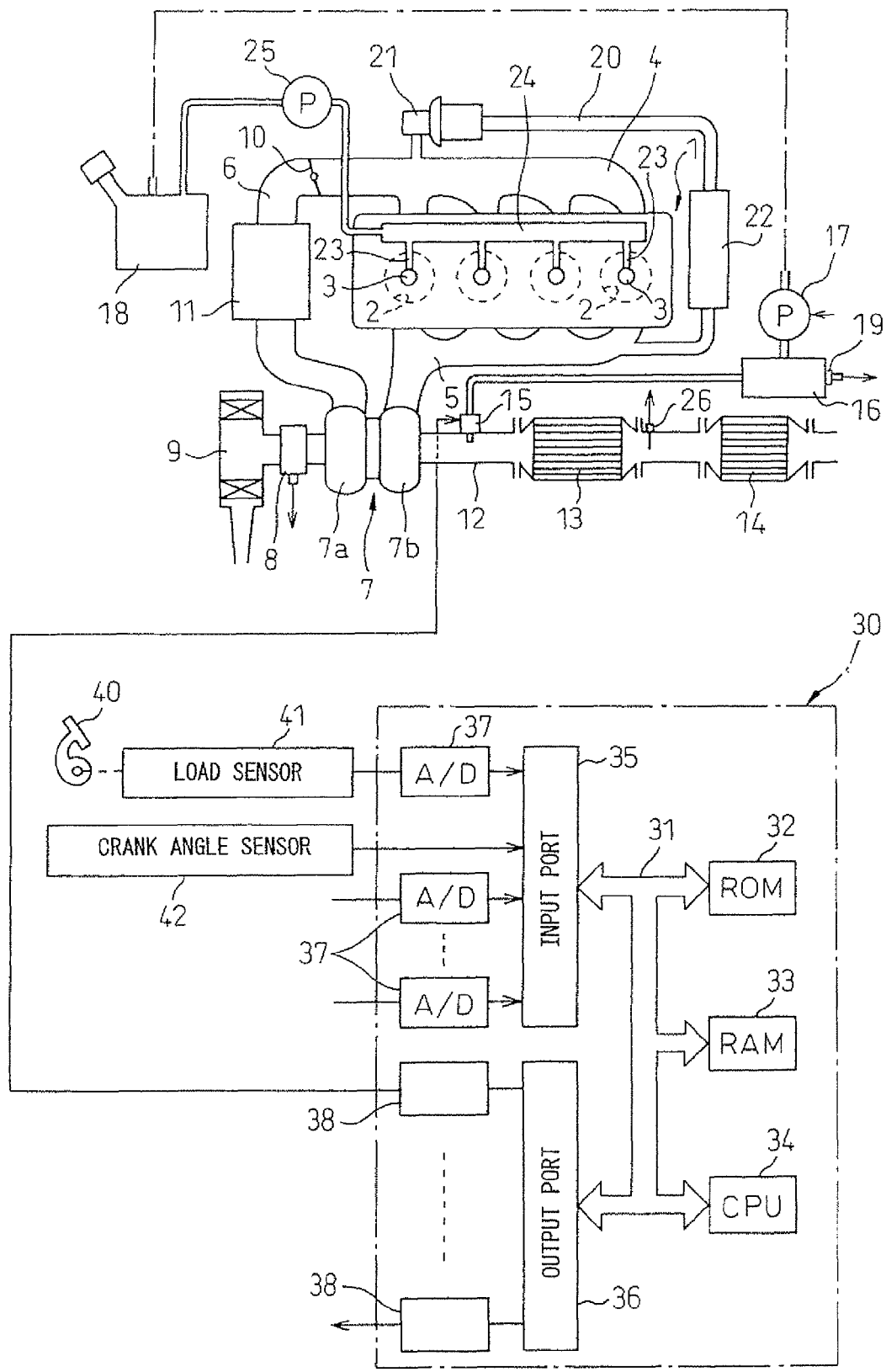
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. The outlet of the exhaust turbine 7b is connected through an exhaust pipe 12 to an inlet of an exhaust purification catalyst 13, while an outlet of the exhaust purification catalyst 13 is connected to a particulate filter 14 for trapping particulate which is contained in exhaust gas. Inside the exhaust pipe 12 upstream of the exhaust purification catalyst 13, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

As shown in FIG. 1, the hydrocarbon feed valve 15 is connected to a high pressure fuel chamber 16 which is filled with high pressure fuel. This high pressure fuel chamber 16 is fed with fuel from inside the fuel tank 18 through a pressurizing pump 17. The fuel pressure inside of the high pressure fuel chamber 16 is detected by a fuel pressure sensor 19. The pressurizing pump 17 is controlled based on the output signal of the fuel pressure sensor 19 so that the fuel pressure inside of the high pressure fuel chamber 16, that is, the injection pressure, becomes the target injection pressure. This target injection pressure is sometimes maintained constant regardless of the engine operating state, but is sometimes made to change in accordance with the engine operating state.

On the other hand, the exhaust manifold 5 and the intake manifold 4 are connected with each other through an exhaust gas recirculation (hereinafter referred to as an "EGR") passage 20. Inside the EGR passage 20, an electronically controlled EGR control valve 21 is arranged. Further, around the EGR passage 20, a cooling device 22 is arranged for cooling EGR gas flowing through the inside of the EGR passage 20. In the embodiment shown in FIG. 1, the engine cooling water is guided to the inside of the cooling device 22 where the engine cooling water is used to cool the EGR gas. On the other hand, each fuel injector 3 is connected through a fuel feed tube 23 to a common rail 24. This common rail 24 is connected through an electronically controlled variable discharge fuel pump 25 to the fuel tank 18. The fuel which is stored inside of the fuel tank 18 is fed by the fuel pump 25 to the inside of the common rail 24. The fuel which is fed to the inside of the common rail 24 is fed through each fuel feed tube 23 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13, a temperature sensor 26 is attached for detecting the temperature of the exhaust purification catalyst 13. The output signals of this temperature sensor 26, fuel pressure sensor 19, and intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, a step motor for driving the throttle valve 10, hydrocarbon feed valve 15, EGR control valve 21, and fuel pump 25.

Figure 2:
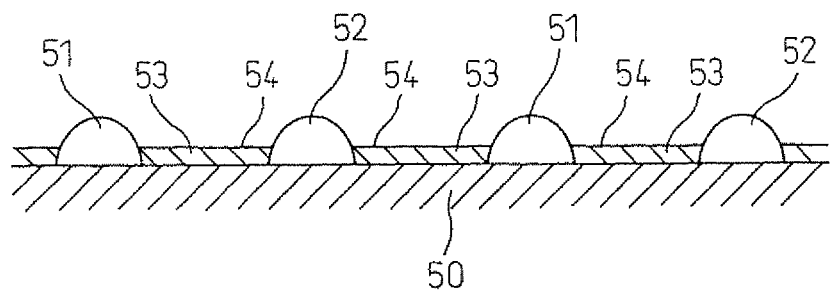
FIG. 2 is a view schematically showing a surface part of a catalyst carrier.

FIG. 2 schematically shows a surface part of a catalyst carrier which is carried on a substrate of the exhaust purification catalyst 13. At this exhaust purification catalyst 13, as shown in FIG. 2, for example, there is provided a catalyst carrier 50 made of alumina on which precious metal catalysts 51 and 52 are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_x$. The exhaust gas flows along the top of the catalyst carrier 50, so the precious metal catalysts 51 and 52 can be said to be carried on the exhaust gas flow surface of the exhaust purification catalyst 13. Further, the surface of the basic layer 53 exhibits basicity, so the surface of the basic layer 53 is called the basic exhaust gas flow surface part 54.

On the other hand, in FIG. 2, the precious metal catalyst 51 is comprised of platinum Pt, while the precious metal catalyst 52 is comprised of rhodium Rh. That is, the precious metal catalysts 51 and 52 which are carried on the catalyst carrier 50 are comprised of platinum Pt and rhodium Rh. Note that, on the catalyst carrier 50 of the exhaust purification catalyst 13, in addition to platinum Pt and rhodium Rh, palladium Pd may be further carried or, instead of rhodium Rh, palladium Pd may be carried. That is, the precious metal catalysts 51 and 52 which are carried on the catalyst carrier 50 are comprised of platinum Pt and at least one of rhodium Rh and palladium Pd.

Figure 3:
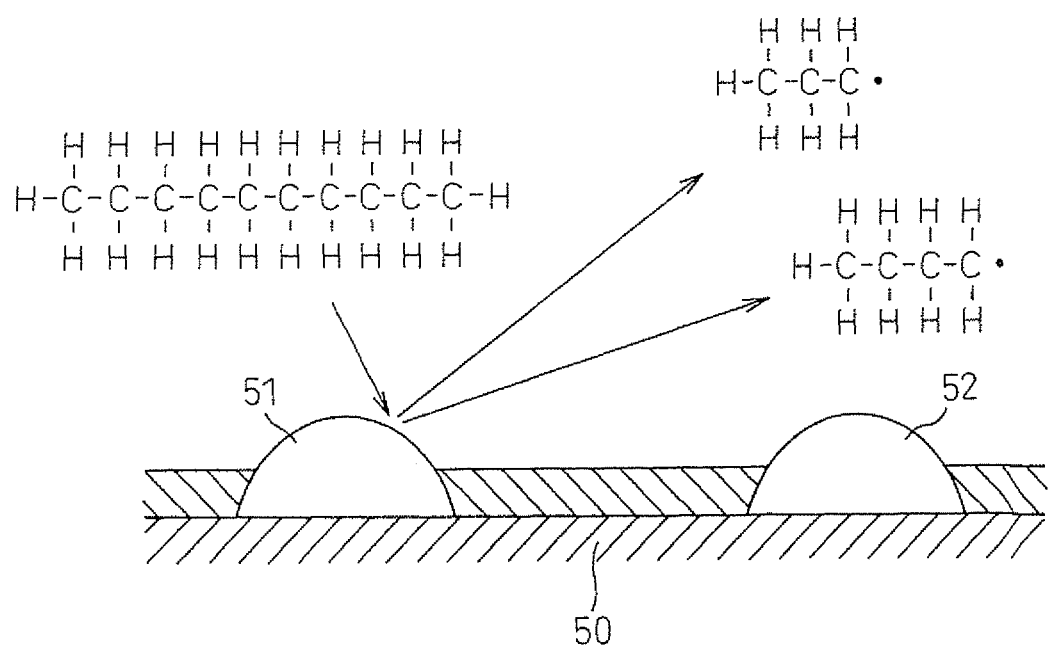
FIG. 3 is a view for explaining an oxidation reaction in an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_x$ at the exhaust purification catalyst 13. FIG. 3 schematically shows the reforming action performed at the exhaust purification catalyst 13 at this time. As shown in FIG. 3, the hydrocarbons HC which are injected from the hydrocarbon feed valve 15 become radical hydrocarbons HC with a small carbon number by the catalyst 51.

Figure 4:
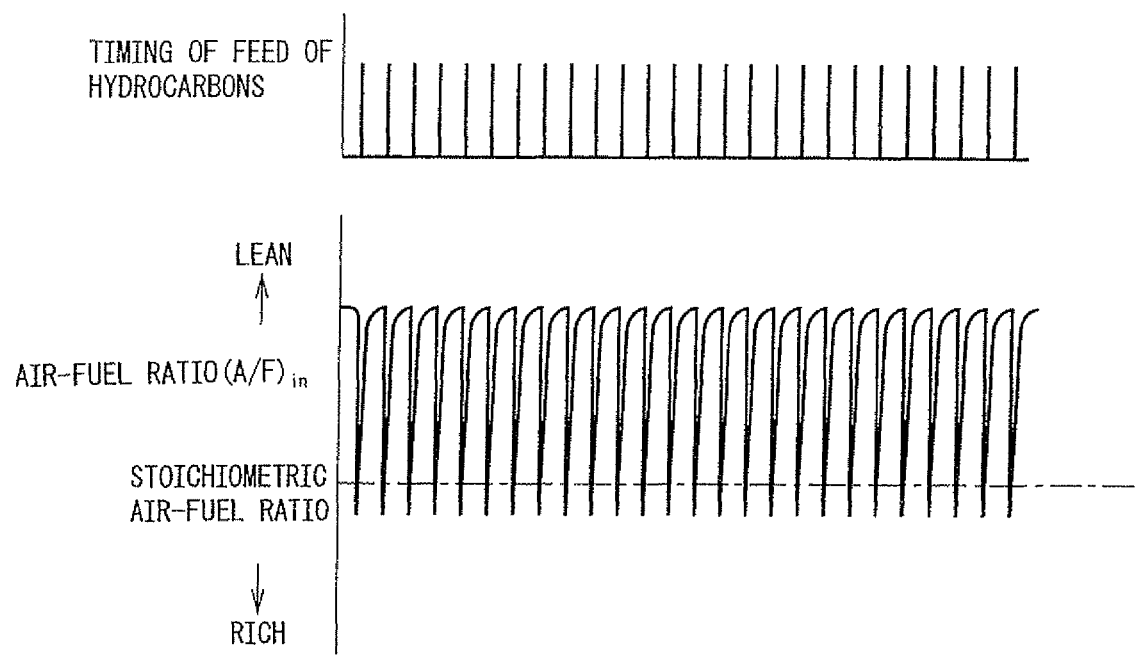
FIG. 4 is a view showing a change of an air-fuel ratio of exhaust gas flowing into an exhaust purification catalyst.

FIG. 4 shows the feed timing of hydrocarbons from the hydrocarbon feed valve 15 and the change in the air-fuel ratio (A/F) in of the exhaust gas which flows into the exhaust purification catalyst 13. Note that, the changes in the air-fuel ratio (A/F) in depend on the change in concentration of the hydrocarbons in the exhaust gas which flows into the exhaust purification catalyst 13, so it can be said that the change in the air-fuel ratio (A/F) in shown in FIG. 4 expresses the change in concentration of the hydrocarbons. However, if the hydrocarbon concentration becomes higher, the air-fuel ratio (A/F) in becomes smaller, so, in FIG. 4, the more to the rich side the air-fuel ratio (A/F) in becomes, the higher the hydrocarbon concentration.

Figure 5:
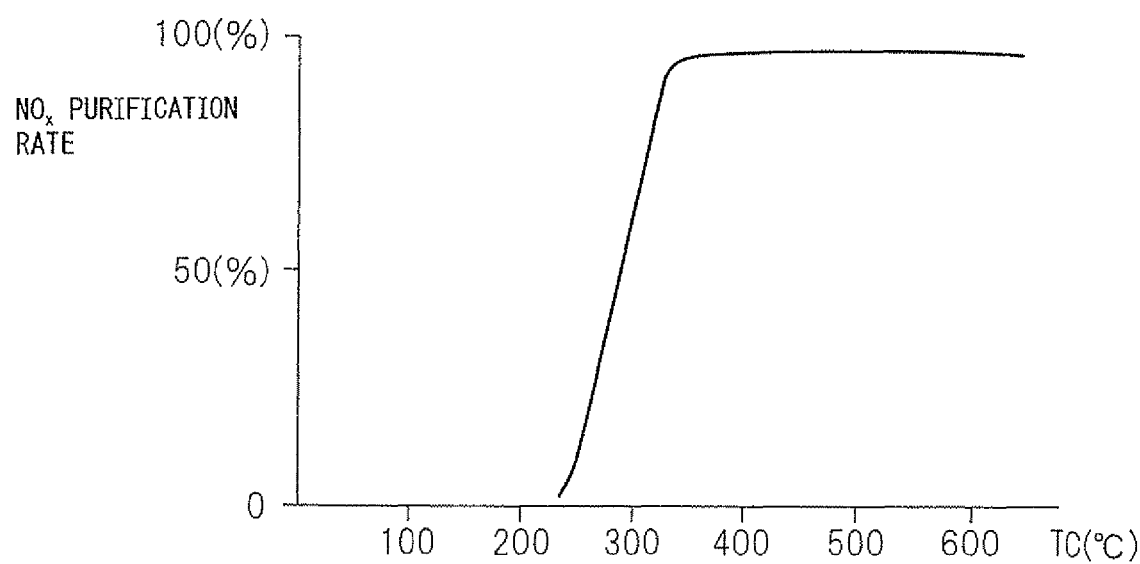
FIG. 5 is a view showing an $NO_x$ purification rate.

FIG. 5 shows the $NO_x$ purification rate by the exhaust purification catalyst 13 with respect to the catalyst temperatures of the exhaust purification catalyst 13 when periodically making the concentration of hydrocarbons flowing into the exhaust purification catalyst 13 change so as to, as shown in FIG. 4, make the air-fuel ratio (A/F) in of the exhaust gas flowing to the exhaust purification catalyst 13 change. The inventors engaged in research relating to $NO_x$ purification for a long time. In the process of research, they learned that if making the concentration of hydrocarbons flowing into the exhaust purification catalyst 13 vibrate by within a predetermined range of amplitude and within a predetermined range of period, as shown in FIG. 5, an extremely high $NO_x$ purification rate is obtained even in a 400° C. or higher high temperature region.

Figure 6A:
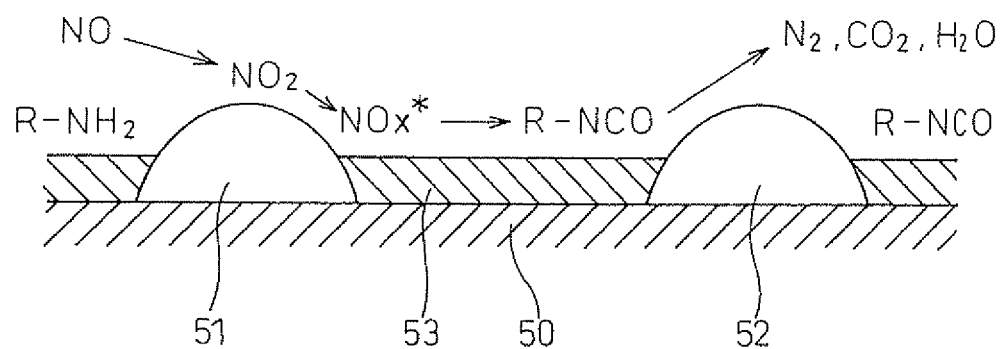
FIGS. 6A and 6B are views for explaining an oxidation reduction reaction in an exhaust purification catalyst.
Figure 6B:
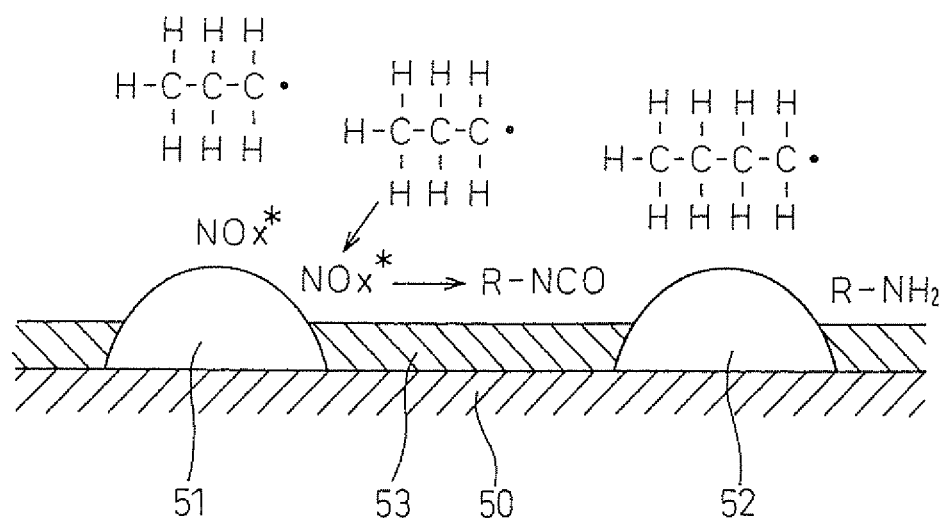

Furthermore, at this time, a large amount of reducing intermediate containing nitrogen and hydrocarbons continues to be held or adsorbed on the surface of the basic layer 53, that is, on the basic exhaust gas flow surface part 54 of the exhaust purification catalyst 13. It is learned that this reducing intermediate plays a central role in obtaining a high $NO_x$ purification rate. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons flowing into the exhaust purification catalyst 13 is made to vibrate by within a predetermined range of amplitude and within a predetermined range of period.

FIG. 6A shows when the concentration of hydrocarbons flowing into the exhaust purification catalyst 13 is low, while FIG. 6B shows when hydrocarbons are fed from the hydrocarbon feed valve 15 and the concentration of hydrocarbons flowing into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. Therefore, the NO which is contained in the exhaust gas, as shown in FIG. 6A, is oxidized on the platinum 51 and becomes $NO_2$. Next, this $NO_2$ is further oxidized and becomes $NO_3$. Further part of the $NO_2$ becomes $NO_2^-$. In this case, the amount of production of $NO_3$ is far greater than the amount of production of $NO_2^-$. Therefore, on the platinum Pt 51, a large amount of $NO_3$ and a small amount of $NO_2^-$ are produced. These $NO_3$ and $NO_2^-$ are strong in activity. Below, these $NO_3$ and $NO_2^-$ will be referred to as the active $NO_x^*$.

On the other hand, if hydrocarbons are fed from the hydrocarbon feed valve 15, as shown in FIG. 3, the hydrocarbons are reformed and become radicalized inside of the exhaust purification catalyst 13. As a result, as shown in FIG. 6B, the hydrogen concentration around the active $NO_x^*$ becomes higher. In this regard, if, after the active $NO_x^*$ is produced, the state of a high oxygen concentration around the active $NO_x^*$ continues for a constant time or more, the active $NO_x^*$ is oxidized and is absorbed in the form of nitrate ions $NO_3^-$ inside the basic layer 53. However, if, before this constant time elapses, the hydrocarbon concentration around the active $NO_x^*$ becomes higher, as shown in FIG. 6B, the active $NO_x^*$ reacts on the platinum 51 with the radical hydrocarbons HC to thereby form the reducing intermediate. This reducing intermediate is adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO, when hydrolyzed, becomes an amine compound R—$NH_2$. However, in this case, what is hydrolyzed is considered to be part of the isocyanate compound R—NCO. Therefore, as shown in FIG. 6B, the majority of the reducing intermediate which is held or adsorbed on the surface of the basic layer 53 is believed to be the isocyanate compound R—NCO and amine compound R—NH$_2$.

On the other hand, as shown in FIG. 6B, if the produced reducing intermediate is surrounded by the hydrocarbons HC, the reducing intermediate is blocked by the hydrocarbons HC and the reaction will not proceed any further. In this case, if the concentration of hydrocarbons flowing into the exhaust purification catalyst 13 is lowered and thereby the oxygen concentration becomes higher, the hydrocarbons around the reducing intermediate will be oxidized. As a result, as shown in FIG. 6A, the reducing intermediate and the active NO$_x$* react. At this time, the active NO$_x$* reacts with the reducing intermediate R—NCO or R—NH$_2$ to become N2, CO$_2$, H$_2$O, therefore the NO$_x$ is removed.

In this way, in the exhaust purification catalyst 13, by making the concentration of hydrocarbons flowing into the exhaust purification catalyst 13 higher, a reducing intermediate is produced. The concentration of hydrocarbons flowing into the exhaust purification catalyst 13 is lowered and the oxygen concentration is raised so that the active NO$_x$* reacts with the reducing intermediate and the NO$_x$ is removed. That is, in order for the exhaust purification catalyst 13 to remove the NO$_x$, the concentration of hydrocarbons flowing into the exhaust purification catalyst 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the active NO$_x$*. That is, it is necessary to make the concentration of hydrocarbons flowing into the exhaust purification catalyst 13 vibrate by within a predetermined range of amplitude. Note that, in this case, it is necessary to hold a sufficient amount of reducing intermediate R—NCO or R—NH$_2$ on the basic layer 53, that is, the basic exhaust gas flow surface part 24, until the produced reducing intermediate reacts with the active NO$_x$*. For this reason, the basic exhaust gas flow surface part 24 is provided.

On the other hand, if lengthening the feed period of the hydrocarbons, the time in which the oxygen concentration becomes higher becomes longer in the period after the hydrocarbons are fed until the hydrocarbons are next fed. Therefore, the active NO$_x$* is absorbed in the basic layer 53 in the form of nitrates without producing a reducing intermediate. To avoid this, it is necessary to make the concentration of hydrocarbons flowing into the exhaust purification catalyst 13 vibrate by within a predetermined range of period.

Therefore, in an embodiment of the present invention, to make the NO$_x$ contained in the exhaust gas and the reformed hydrocarbons react and produce the reducing intermediate R—NCO or R—NH$_2$ containing nitrogen and hydrocarbons, precious metal catalysts 51 and 52 are carried on the exhaust gas flow surface of the exhaust purification catalyst 13. To hold the produced reducing intermediate R—NCO or R—NH$_2$ inside the exhaust purification catalyst 13, a basic exhaust gas flow surface part 54 is formed around the precious metal catalysts 51 and 52. NO$_x$ is reduced by the reducing action of the reducing intermediate R—NCO or R—NH$_2$ held on the basic exhaust gas flow surface part 54, and the vibration period of the hydrocarbon concentration is made the vibration period required for continuation of the production of the reducing intermediate R—NCO or R—NH$_2$. Incidentally, in the example shown in FIG. 4, the injection interval is made 3 seconds.

Figure 7A:
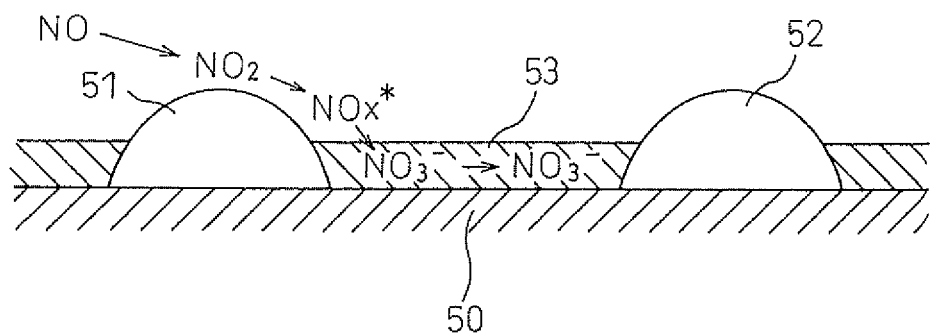
FIGS. 7A and 7B are views for explaining an oxidation reduction reaction in an exhaust purification catalyst.

If the vibration period of the hydrocarbon concentration, that is, the feed period of the hydrocarbons HC, is made longer than the above predetermined range of period, the reducing intermediate R—NCO or R—NH$_2$ disappears from the surface of the basic layer 53. At this time, the active NO$_x$* which is produced on the platinum Pt 53, as shown in FIG. 7A, diffuses in the basic layer 53 in the form of nitrate ions NO$_3^-$ and becomes nitrates. That is, at this time, the NO$_x$ in the exhaust gas is absorbed in the form of nitrates inside of the basic layer 53.

Figure 7B:
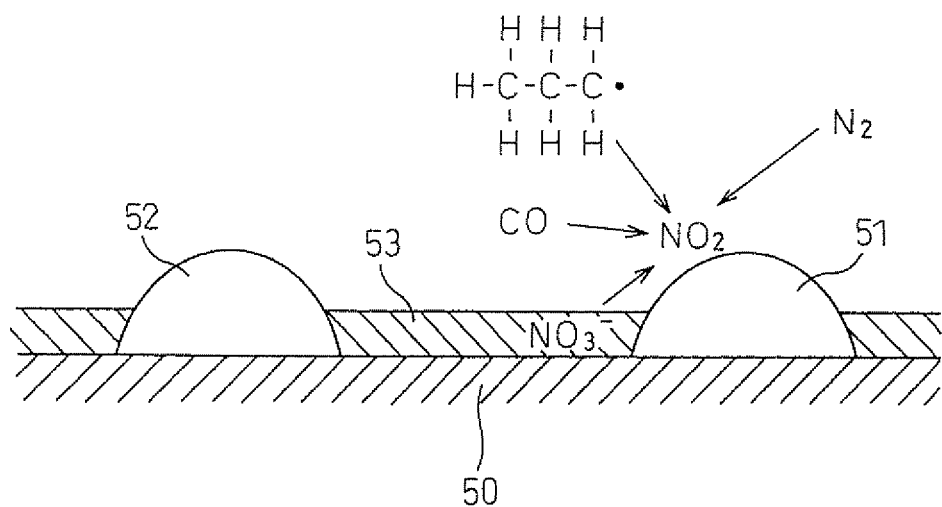

On the other hand, FIG. 7B shows the case where the air-fuel ratio of the exhaust gas which flows into the exhaust purification catalyst 13 is made the stoichiometric air-fuel ratio or rich when the NO$_x$ is absorbed in the form of nitrates inside of the basic layer 53. In this case, the oxygen concentration in the exhaust gas falls, so the reaction proceeds in the opposite direction (NO$_3^-$→NO$_2$), and consequently the nitrates absorbed in the basic layer 53 become nitrate ions NO$_3^-$ one by one and, as shown in FIG. 7B, are released from the basic layer 53 in the form of NO$_2$. Next, the released NO$_2$ is reduced by the hydrocarbons HC and CO contained in the exhaust gas.

Figure 8:
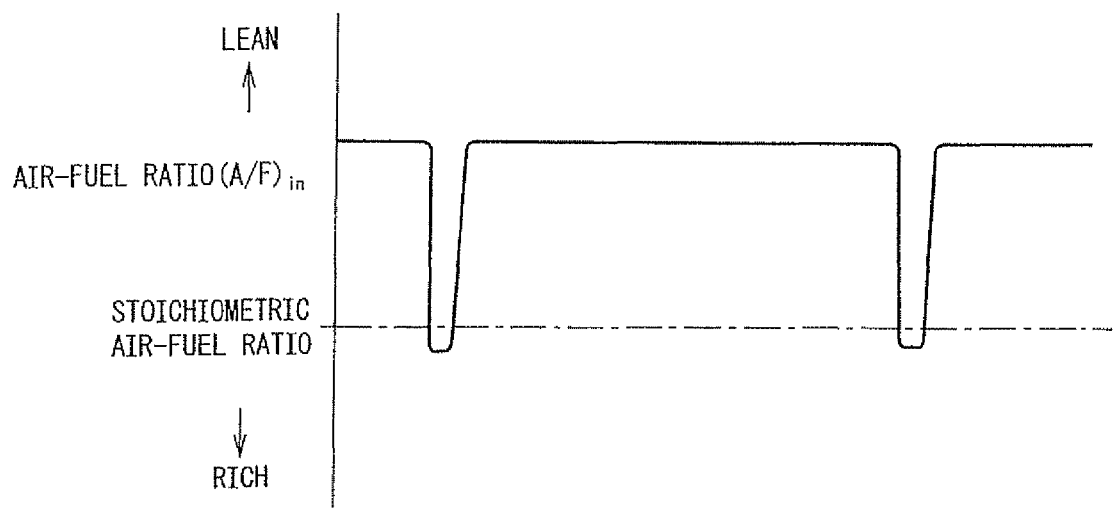
FIG. 8 is a view showing a change of an air-fuel ratio of exhaust gas flowing into an exhaust purification catalyst.

FIG. 8 shows the case of making the air-fuel ratio (A/F) in of the exhaust gas which flows into the exhaust purification catalyst 13 temporarily rich slightly before the NO$_x$ absorption ability of the basic layer 53 becomes saturated. Note that, in the example shown in FIG. 8, the time interval of this rich control is 1 minute or more. In this case, the NO$_x$ which was absorbed in the basic layer 53 when the air-fuel ratio (A/F) in of the exhaust gas was lean is released all at once from the basic layer 53 and reduced when the air-fuel ratio (A/F) in of the exhaust gas is made temporarily rich. Therefore, in this case, the basic layer 53 plays the role of an absorbent for temporarily absorbing NO$_x$.

Note that, at this time, sometimes the basic layer 53 temporarily adsorbs the NO$_x$. Therefore, if using term of storage as a term including both absorption and adsorption, at this time, the basic layer 53 performs the role of an NO$_x$ storage agent for temporarily storing the NO$_x$. That is, in this case, if the ratio of the air and fuel (hydrocarbons) which are supplied into the engine intake passage, combustion chambers 2, and exhaust passage upstream of the exhaust purification catalyst 13 is referred to as the air-fuel ratio of the exhaust gas, the exhaust purification catalyst 13 functions as an NO$_x$ storage catalyst which stores the NO$_x$ when the air-fuel ratio of the exhaust gas is lean and releases the stored NO$_x$ when the oxygen concentration in the exhaust gas falls.

Figure 9:
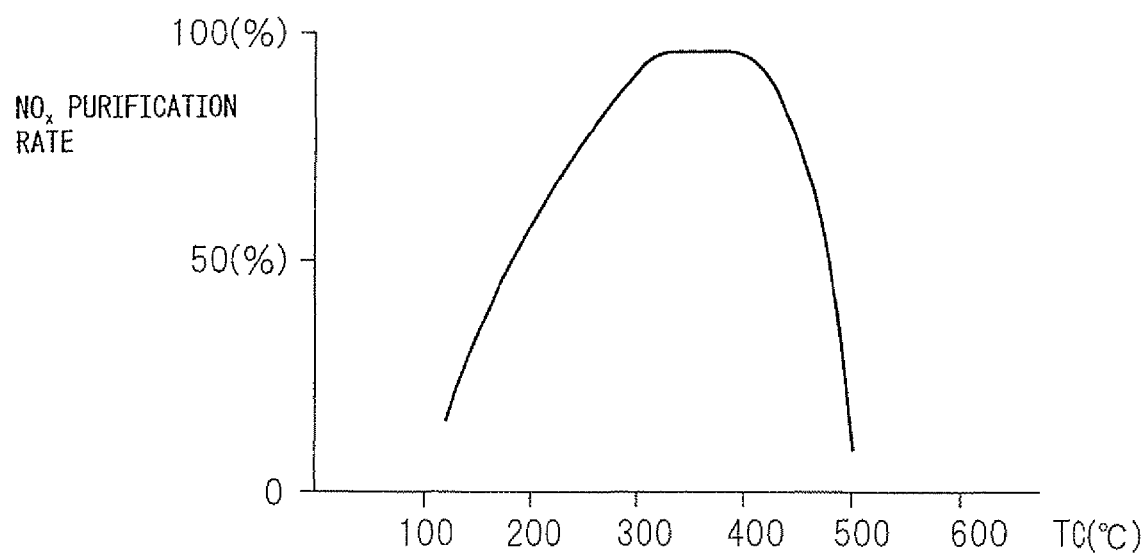
FIG. 9 is a view of an $NO_x$ purification rate.

FIG. 9 shows the NO$_x$ purification rate when making the exhaust purification catalyst 13 function as an NO$_x$ storage catalyst in this way. Note that, the abscissa of the FIG. 9 shows the catalyst temperature TC of the exhaust purification catalyst 13. When making the exhaust purification catalyst 13 function as an NO$_x$ storage catalyst, as shown in FIG. 9, when the catalyst temperature TC is 300° C. to 400° C., an extremely high NO$_x$ purification rate is obtained, but when the catalyst temperature TC becomes a 400° C. or higher high temperature, the NO$_x$ purification rate falls.

In this way, when the catalyst temperature TC becomes 400° C. or more, the NO$_x$ purification rate falls because if the catalyst temperature TC becomes 400° C. or more, the nitrates break down by heat and are released in the form of NO$_2$ from the exhaust purification catalyst 13. That is, so long as storing NO$_x$ in the form of nitrates, when the catalyst temperature TC is high, it is difficult to obtain a high NO$_x$ purification rate. However, in the new $NO_x$ purification method shown from FIG. 4 to FIGS. 6A and 6B, as will be understood from FIGS. 6A and 6B, nitrates are not formed or even if formed are extremely fine in amount, consequently, as shown in FIG. 5, even when the catalyst temperature TC is high, a high $NO_x$ purification rate is obtained.

Therefore, in the present invention, a hydrocarbon feed valve 15 for feeding hydrocarbons is arranged inside of an engine exhaust passage, an exhaust purification catalyst 13 for reacting $NO_x$ contained in exhaust gas and reformed hydrocarbons is arranged inside of the engine exhaust passage 15 downstream of the hydrocarbon feed valve, a precious metal catalysts 51, 52 is carried on an exhaust gas flow surface of the exhaust purification catalyst 13, a basic exhaust gas flow surface part 54 is formed around the precious metal catalyst 51, 52, the exhaust purification catalyst 13 has a property of reducing the $NO_x$ which is contained in exhaust gas if a concentration of hydrocarbons flowing into the exhaust purification catalyst 13 is made to vibrate within a predetermined range of amplitude and within a predetermined range of period and has a property of being increased in storage amount of $NO_x$ which is contained in exhaust gas if the vibration period of the hydrocarbon concentration is made longer than this predetermined range, and, at the time of engine operation, the concentration of hydrocarbons flowing into the exhaust purification catalyst 13 is made to vibrate within the predetermined range of amplitude and within the predetermined range of period to thereby reduce the $NO_x$ which is contained in the exhaust gas in the exhaust purification catalyst 13.

That is, the $NO_x$ purification method which is shown from FIG. 4 to FIGS. 6A and 6B can be said to be a new $NO_x$ purification method designed to remove $NO_x$ without forming almost any nitrates in the case of using an exhaust purification catalyst which carries a precious metal catalyst and forms a basic layer which can absorb $NO_x$. In actuality, when using this new $NO_x$ purification method, the nitrates which are detected from the basic layer 53 become much smaller in amount compared with the case where making the exhaust purification catalyst 13 function as an $NO_x$ storage catalyst. Note that, this new $NO_x$ purification method will be referred to below as the first $NO_x$ purification method.

Next, referring to FIG. 10 to FIG. 15, this first $NO_x$ purification method will be explained in a bit more detail.

Figure 10:
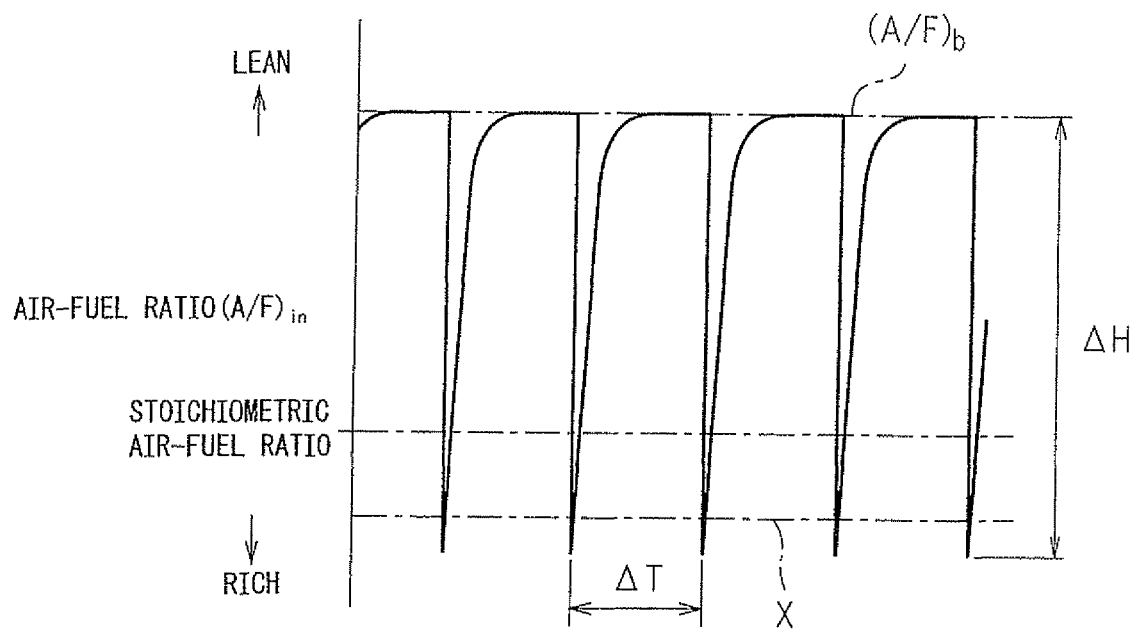
FIG. 10 is a time chart showing a change of an air-fuel ratio of exhaust gas flowing into an exhaust purification catalyst.

FIG. 10 shows enlarged the change in the air-fuel ratio (A/F) in shown in FIG. 4. Note that, as explained above, the change in the air-fuel ratio (A/F) in of the exhaust gas flowing into this exhaust purification catalyst 13 simultaneously shows the change in concentration of the hydrocarbons which flow into the exhaust purification catalyst 13. Note that, in FIG. 10, ΔH shows the amplitude of the change in concentration of hydrocarbons HC which flow into the exhaust purification catalyst 13, while ΔT shows the vibration period of the concentration of the hydrocarbons which flow into the exhaust purification catalyst 13.

Furthermore, in FIG. 10, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the exhaust purification catalyst 13 when stopping the feed of hydrocarbons. On the other hand, in FIG. 10, X shows the upper limit of the air-fuel ratio (A/F) in used for producing the reducing intermediate without the produced active $NO_x$* being stored in the form of nitrates inside the basic layer 53 much at all, To make the active $NO_x$* and the reformed hydrocarbons react to produce a reducing intermediate, the air-fuel ratio (A/F) in has to be made lower than this upper limit X of the air-fuel ratio.

In other words, in FIG. 10, X shows the lower limit of the concentration of hydrocarbons required for making the active $NO_x$* and reformed hydrocarbon react to produce a reducing intermediate. To produce the reducing intermediate, the concentration of hydrocarbons has to be made higher than this lower limit X. In this case, whether the reducing intermediate is produced is determined by the ratio of the oxygen concentration and hydrocarbon concentration around the active $NO_x$*, that is, the air-fuel ratio (A/F) in. The upper limit X of the air-fuel ratio required for producing the reducing intermediate will below be called the demanded minimum air-fuel ratio.

In the example shown in FIG. 10, the demanded minimum air-fuel ratio X is rich, therefore, in this case, to form the reducing intermediate, the air-fuel ratio (A/F) in is instantaneously made the demanded minimum air-fuel ratio X or less, that is, rich. As opposed to this, in the example shown in FIG. 11, the demanded minimum air-fuel ratio X is lean. In this case, the air-fuel ratio (A/F) in is maintained lean while periodically reducing the air-fuel ratio (A/F) in so as to form the reducing intermediate.

In this case, whether the demanded minimum air-fuel ratio X becomes rich or becomes lean depends on the oxidizing strength of the exhaust purification catalyst 13. In this case, the exhaust purification catalyst 13, for example, becomes stronger in oxidizing strength if increasing the carried amount of the precious metal 51 and becomes stronger in oxidizing strength if strengthening the acidity. Therefore, the oxidizing strength of the exhaust purification catalyst 13 changes due to the carried amount of the precious metal 51 or the strength of the acidity.

Figure 11:
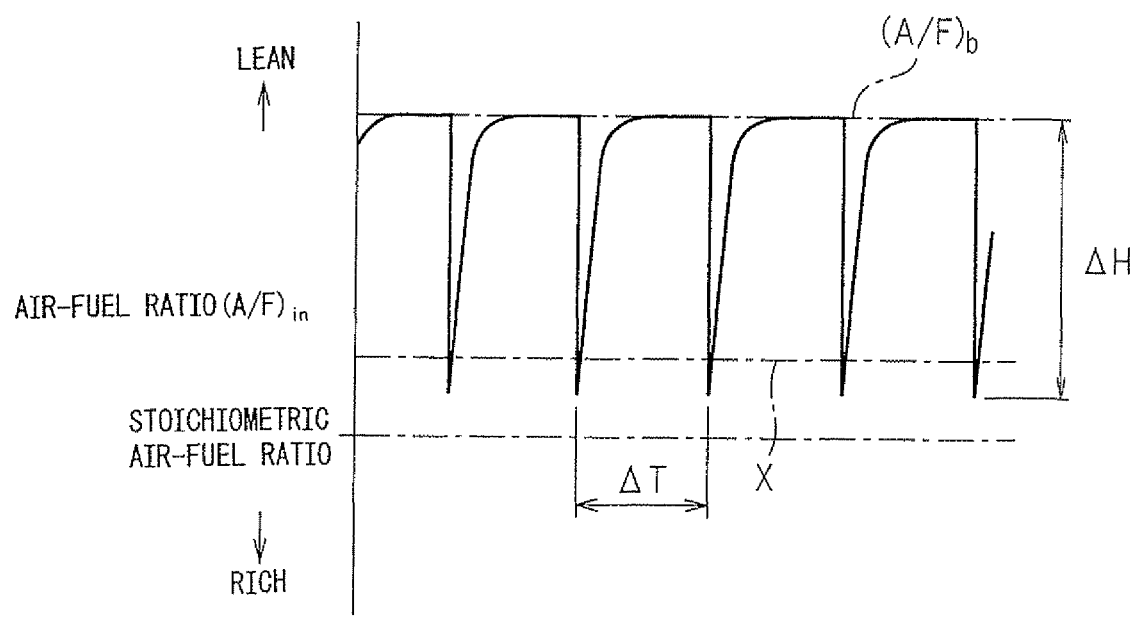
FIG. 11 is a time chart showing a change of an air-fuel ratio of exhaust gas flowing into an exhaust purification catalyst.

Now, if using an exhaust purification catalyst 13 with a strong oxidizing strength, as shown in FIG. 11, if maintaining the air-fuel ratio (A/F) in lean while periodically lowering the air-fuel ratio (A/F) in, the hydrocarbons end up becoming completely oxidized when the air-fuel ratio (A/F) in is reduced. As a result, the reducing intermediate can no longer be produced. As opposed to this, when using an exhaust purification catalyst 13 with a strong oxidizing strength, as shown in FIG. 10, if making the air-fuel ratio (A/F) in periodically rich, when the air-fuel ratio (A/F) in is made rich, the hydrocarbons will be partially oxidized, without being completely oxidized, that is, the hydrocarbons will be reformed, consequently the reducing intermediate will be produced. Therefore, when using an exhaust purification catalyst 13 with a strong oxidizing strength, the demanded minimum air-fuel ratio X has to be made rich.

On the other hand, when using an exhaust purification catalyst 13 with a weak oxidizing strength, as shown in FIG. 11, if maintaining the air-fuel ratio (A/F) in lean while periodically lowering the air-fuel ratio (A/F) in, the hydrocarbons will be partially oxidized without being completely oxidized, that is, the hydrocarbons will be reformed and consequently the reducing intermediate will be produced. As opposed to this, when using an exhaust purification catalyst 13 with a weak oxidizing strength, as shown in FIG. 10, if making the air-fuel ratio (A/F) in periodically rich, a large amount of hydrocarbons will be exhausted from the exhaust purification catalyst 13 without being oxidized and consequently the amount of hydrocarbons which is wastefully consumed will increase. Therefore, when using an exhaust purification catalyst 13 with a weak oxidizing strength, the demanded minimum air-fuel ratio X has to be made lean.

Figure 12:
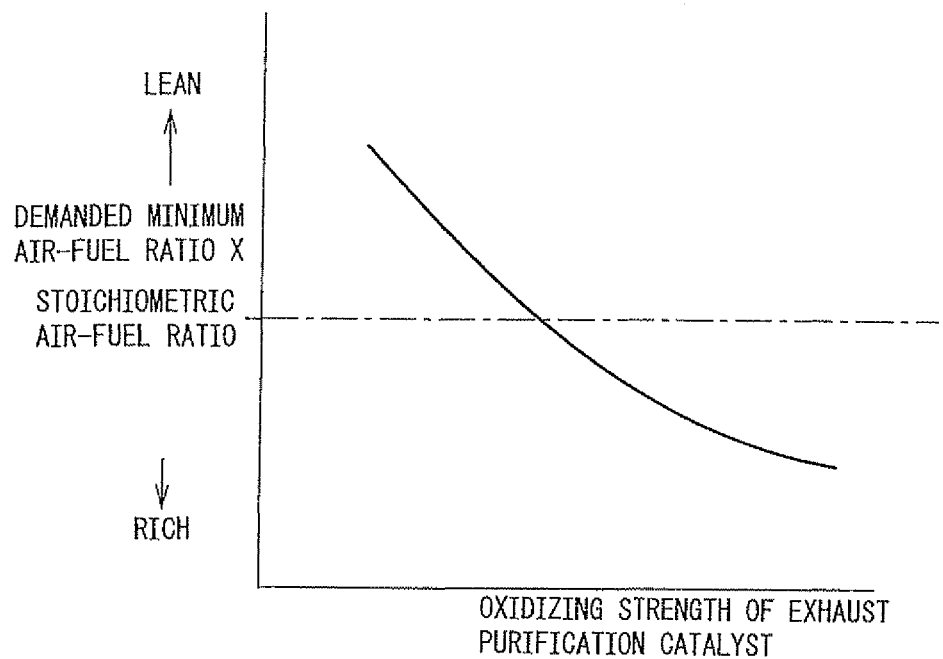
FIG. 12 is a view showing a relationship between an oxidizing strength of an exhaust purification catalyst and a demanded minimum air-fuel ratio X.

That is, it is learned that the demanded minimum air-fuel ratio X, as shown in FIG. 12, has to be reduced the stronger the oxidizing strength of the exhaust purification catalyst 13. In this way the demanded minimum air-fuel ratio X becomes lean or rich due to the oxidizing strength of the exhaust purification catalyst 13. Below, taking as example the case where the demanded minimum air-fuel ratio X is rich, the amplitude of the change in concentration of hydrocarbons flowing into the exhaust purification catalyst 13 and the vibration period of the concentration of hydrocarbons flowing into the exhaust purification catalyst 13 will be explained.

Now, if the base air-fuel ratio (A/F)b becomes larger, that is, if the oxygen concentration in the exhaust gas before the hydrocarbons are fed becomes higher, the feed amount of hydrocarbons required for making the air-fuel ratio (A/F) in the demanded minimum air-fuel ratio X or less increases and along with this the excess amount of hydrocarbons which did not contribute the production of the reducing intermediate also increases. In this case, to remove the $NO_x$ well, as explained above, it is necessary to make the excess hydrocarbons oxidize. Therefore, to remove the $NO_x$ well, the larger the amount of excess hydrocarbons, the larger the amount of oxygen which is required.

In this case, if raising the oxygen concentration in the exhaust gas, the amount of oxygen can be increased. Therefore, to remove the $NO_x$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 13:
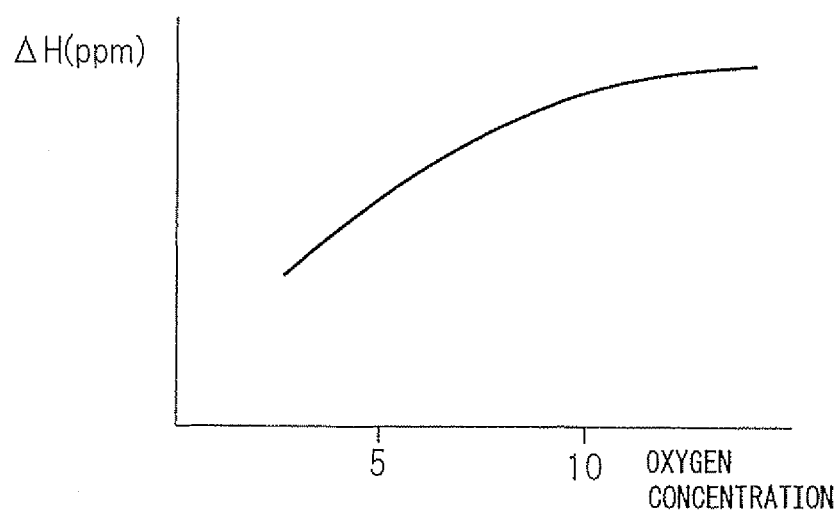
FIG. 13 is a view showing a relationship between an oxygen concentration in exhaust gas and an amplitude $\Delta H$ of a hydrocarbon concentration giving the same $NO_x$ purification rate.

FIG. 13 shows the relationship between the oxygen concentration in the exhaust gas before the hydrocarbons are fed and the amplitude ΔH of the hydrocarbon concentration when the same $NO_x$ purification rate is obtained. From FIG. 13, it is learned that, to obtain the same $NO_x$ purification rate, the higher the oxygen concentration in the exhaust gas before the hydrocarbons are fed, the greater the amplitude ΔH of the hydrocarbon concentration has to be made. That is, to obtain the same $NO_x$ purification rate, the higher the base air-fuel ratio (A/F)b, the greater the amplitude ΔT of the hydrocarbon concentration has to be made. In other words, to remove the $NO_x$ well, the lower the base air-fuel ratio (A/F)b, the more the amplitude ΔT of the hydrocarbon concentration can be reduced.

Figure 14:
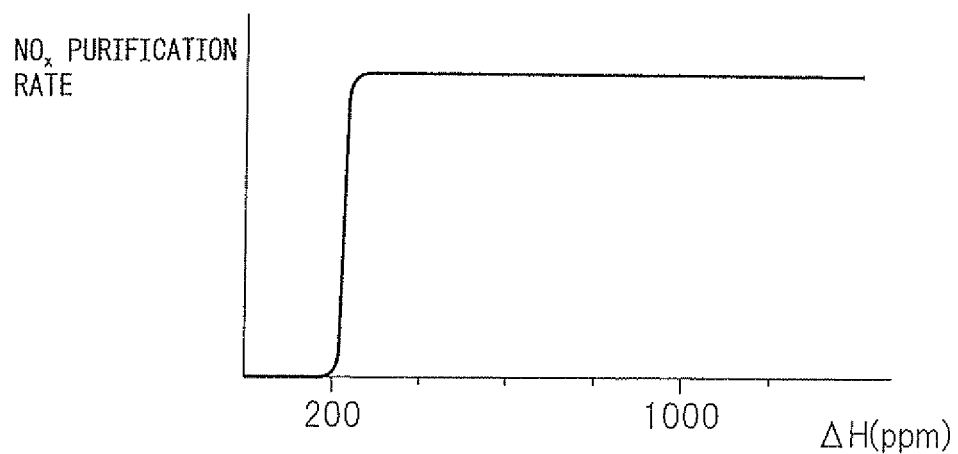
FIG. 14 is a view showing a relationship between an amplitude $\Delta H$ of a hydrocarbon concentration and an $NO_x$ purification rate.

In this regard, the base air-fuel ratio (A/F)b becomes the lowest at the time of an acceleration operation. At this time, if the amplitude ΔH of the hydrocarbon concentration is about 200 ppm, it is possible to remove the $NO_x$ well. The base air-fuel ratio (A/F)b is normally larger than the time of acceleration operation. Therefore, as shown in FIG. 14, if the amplitude ΔH of the hydrocarbon concentration is 200 ppm or more, an excellent $NO_x$ purification rate can be obtained.

On the other hand, it is learned that when the base air-fuel ratio (A/F)b is the highest, if making the amplitude ΔH of the hydrocarbon concentration 10000 ppm or so, an excellent $NO_x$ purification rate is obtained. Therefore, in the present invention, the predetermined range of the amplitude of the hydrocarbon concentration is made 200 ppm to 10000 ppm.

Figure 15:
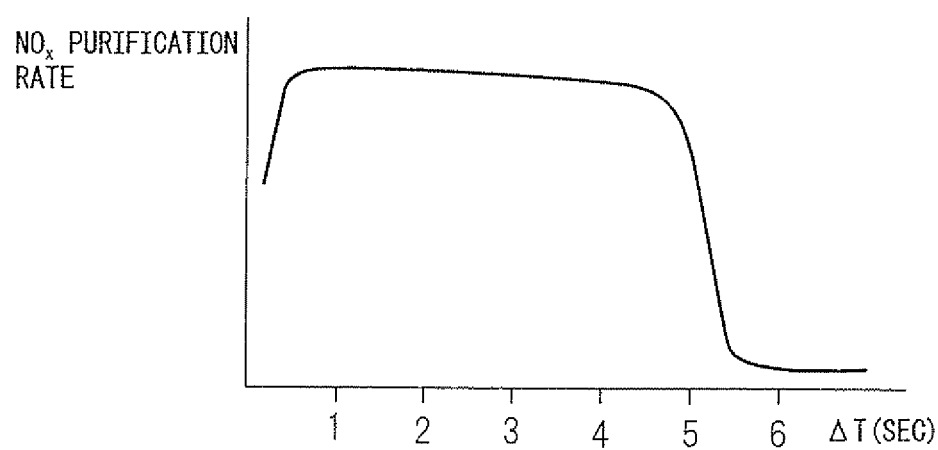
FIG. 15 is a view showing a relationship of a vibration period $\Delta T$ of a hydrocarbon concentration and an $NO_x$ purification rate.

Further, if the vibration period ΔT of the hydrocarbon concentration becomes longer, the oxygen concentration around the active $NO_x^*$ becomes higher in the time after the hydrocarbons are fed to when the hydrocarbons are next fed. In this case, if the vibration period ΔT of the hydrocarbon concentration becomes longer than about 5 seconds, the active $NO_x^*$ starts to be absorbed in the form of nitrates inside the basic layer 53. Therefore, as shown in FIG. 15, if the vibration period ΔT of the hydrocarbon concentration becomes longer than about 5 seconds, the $NO_x$ purification rate falls. Therefore, the vibration period ΔT of the hydrocarbon concentration has to be made 5 seconds or less.

On the other hand, if the vibration period ΔT of the hydrocarbon concentration becomes about 0.3 second or less, the fed hydrocarbons start to build up on the exhaust gas flow surface of the exhaust purification catalyst 13, therefore, as shown in FIG. 15, if the vibration period ΔT of the hydrocarbon concentration becomes about 0.3 second or less, the $NO_x$ purification rate falls. Therefore, in the present invention, the vibration period of the hydrocarbon concentration is made from 0.3 second to 5 seconds.

Next, referring to FIG. 16 to FIG. 19, an $NO_x$ purification method in the case when making the exhaust purification catalyst 13 function as an $NO_x$ storage catalyst will be explained in detail. The $NO_x$ purification method in the case when making the exhaust purification catalyst 13 function as an $NO_x$ storage catalyst in this way will be referred to below as the second $NO_x$ purification method.

Figure 16:
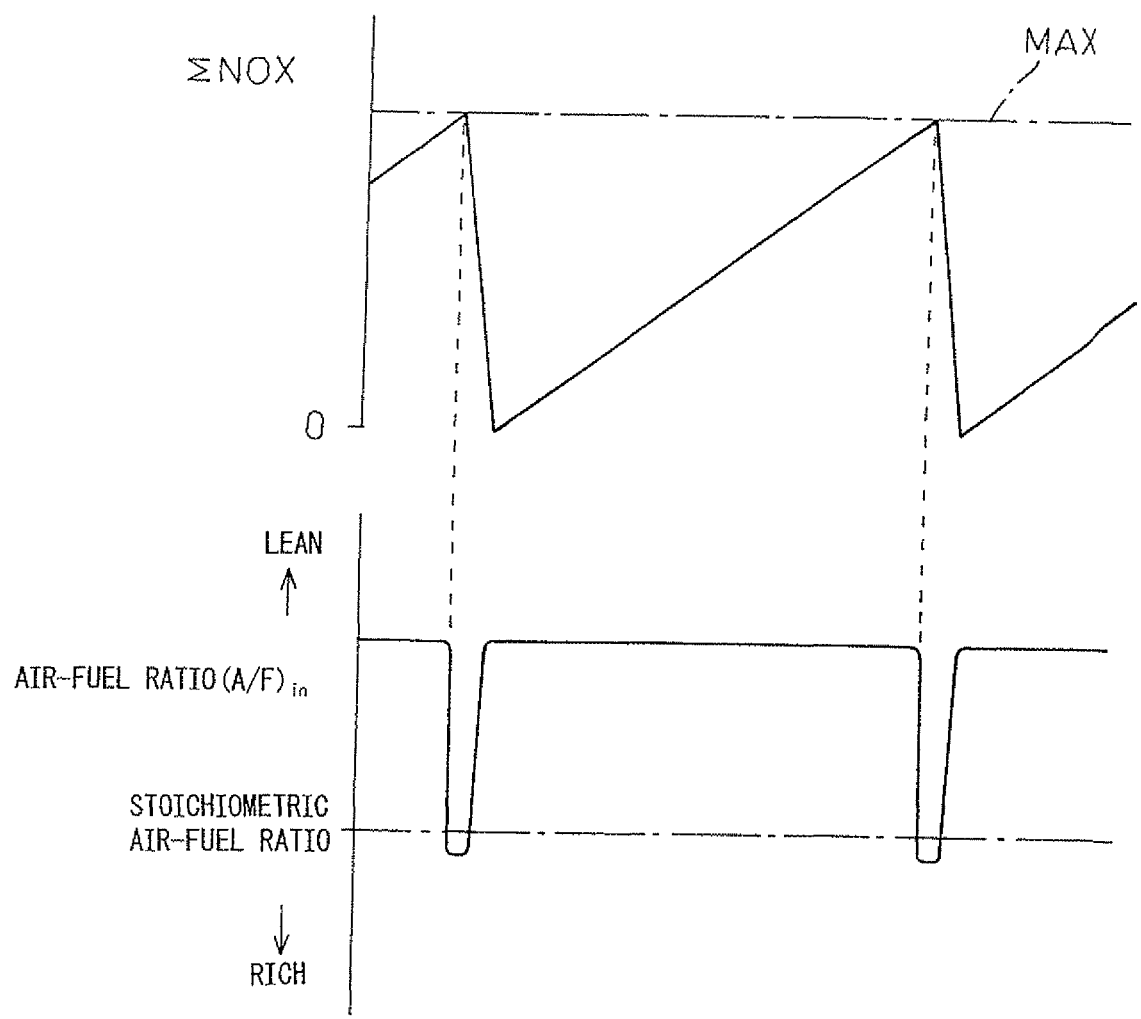
FIG. 16 is a view showing a change in the air-fuel ratio of the exhaust gas flowing to the exhaust purification catalyst etc.

In this second $NO_x$ purification method, as shown in FIG. 16, when the stored $NO_x$ amount $\Sigma NO_x$ of $NO_x$ which is stored in the basic layer 53 exceeds a predetermined allowable amount MAX, the air-fuel ratio (A/F) in of the exhaust gas flowing into the exhaust purification catalyst 13 is temporarily made rich. If the air-fuel ratio (A/F) in of the exhaust gas is made rich, the $NO_x$ which was stored in the basic layer 53 when the air-fuel ratio (A/F) in of the exhaust gas was lean is released from the basic layer 53 all at once and reduced. Due to this, the $NO_x$ is removed.

Figure 17:
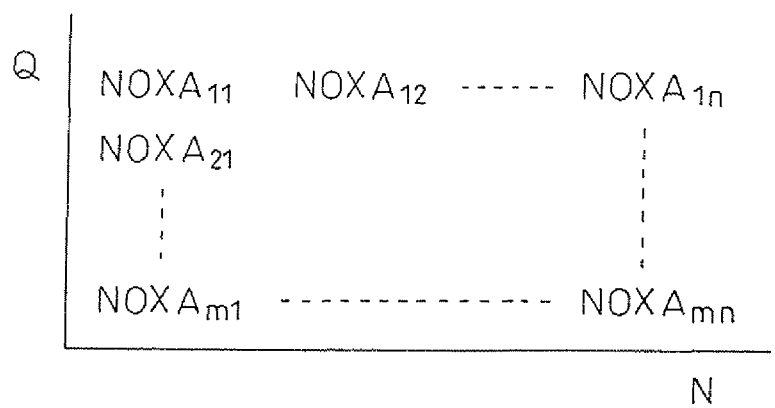
FIG. 17 is a view showing a map of an exhausted $NO_x$ amount NOXA.

The stored $NO_x$ amount $\Sigma NO_x$ is, for example, calculated from the amount of $NO_x$ which is exhausted from the engine. In this embodiment according to the present invention, the exhausted $NO_x$ amount NOXA of $NO_x$ which is exhausted from the engine per unit time is stored as a function of the injection amount Q and engine speed N in the form of a map such as shown in FIG. 17 in advance in the ROM 32. The stored $NO_x$ amount $\Sigma NO_x$ is calculated from exhausted $NO_x$ amount NOXA. In this case, as explained before, the period in which the air-fuel ratio (A/F) in of the exhaust gas is made rich is usually 1 minute or more.

Figure 18:
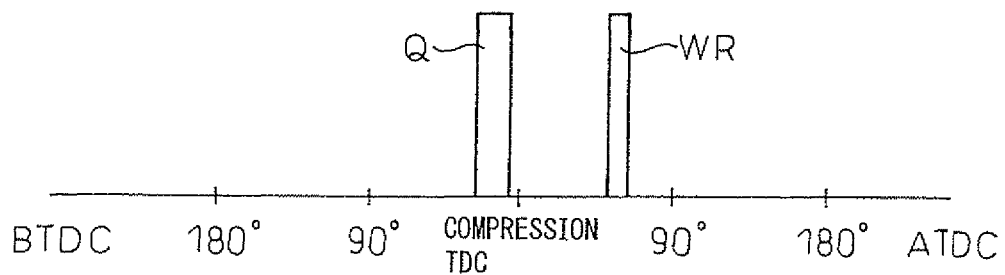
FIG. 18 is a view showing a fuel injection timing.
Figure 19:
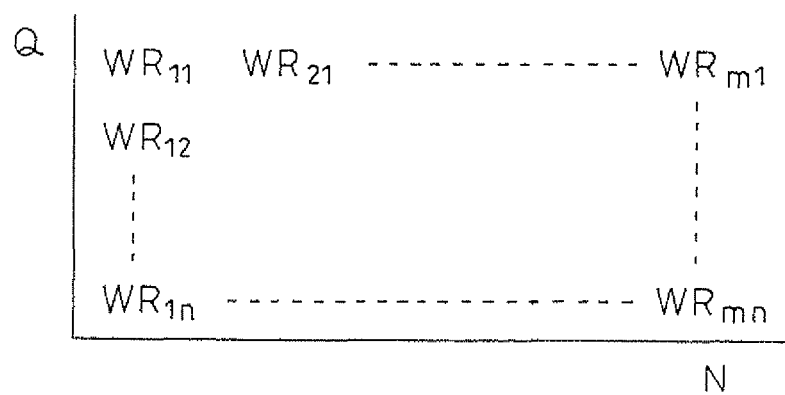
FIG. 19 is a view showing a map of a hydrocarbon feed amount WR.

In this second $NO_x$ purification method, as shown in FIG. 18, the fuel injector 3 injects additional fuel WR into the combustion chamber 2 in addition to the combustion-use fuel Q so that the air-fuel ratio (A/F) in of the exhaust gas flowing into the exhaust purification catalyst 13 is made rich. Note that, in FIG. 18, the abscissa indicates the crank angle. This additional fuel WR is injected at a timing at which it will burn, but will not appear as engine output, that is, slightly before ATDC90° after compression top dead center. This fuel amount WR is stored as a function of the injection amount Q and engine speed N in the form of a map such as shown in FIG. 19 in advance in the ROM 32. Of course, in this case, it is also possible to make the amount of feed of hydrocarbons from the hydrocarbon feed valve 15 increase so as to make the air-fuel ratio (A/F) in of the exhaust gas rich.

Now, returning again to the explanation of the first $NO_x$ purification method, to use the first $NO_x$ purification method to remove the $NO_x$ well, as explained before, the amplitude ΔH and vibration period ΔT of the hydrocarbon concentration have to be suitably controlled. That is, to use the first $NO_x$ purification method to remove the $NO_x$ well, the amplitude ΔH of the hydrocarbon concentration has to be controlled so that the air-fuel ratio (A/F) in of the exhaust gas which flows into the exhaust purification catalyst 13 becomes the demanded minimum air-fuel ratio X or less and the vibration period ΔT of the hydrocarbon concentration has to be controlled to 0.3 second to 5 seconds.

In this case, in the present invention, the vibration period $\Delta T$ of the hydrocarbon concentration is controlled by controlling at least one of the injection time or injection pressure of hydrocarbons from the hydrocarbon feed valve 15, while the vibration period $\Delta T$ of the hydrocarbon concentration is controlled by controlling the injection period of hydrocarbons from the hydrocarbon feed valve 15.

In this regard, in this case, what is most demanded is that it be able to obtain the highest $NO_x$ purification rate no matter what the operating state and that the fed hydrocarbons not pass straight through the exhaust purification catalyst 13. The inventors repeatedly studied this point and as a result learned that in the exhaust purification catalyst 13, the amount of completely oxidized hydrocarbons and the amount of partially oxidized hydrocarbons govern the $NO_x$ purification rate and the amount of hydrocarbons passing straight through. Next, this will be explained with reference to FIG. 20.

Figure 20:
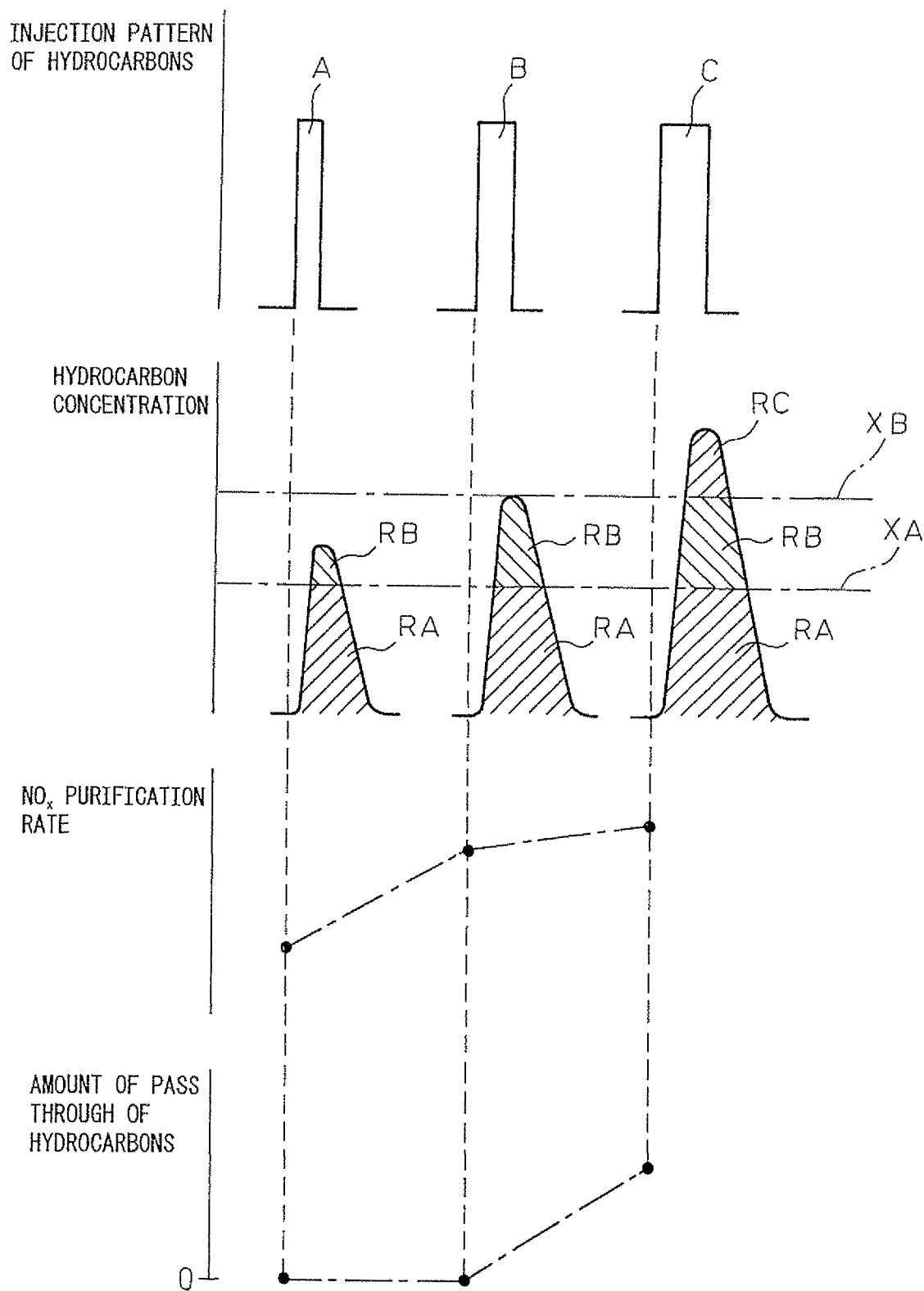
FIG. 20 is a view showing changes of an injection pattern of hydrocarbons from a hydrocarbon feed valve, a hydrocarbon concentration in the exhaust gas flowing into the exhaust purification catalyst, etc.

FIG. 20 shows the three injection patterns A, B, and C of hydrocarbons which are injected by different injection times from the hydrocarbon feed valve 15 under the same injection pressure. In this case, the injection time is the shortest in the injection pattern A and is longest in the injection pattern C. Further, FIG. 20 shows a change in the hydrogen concentration with a lapse of time in the exhaust gas which flows into the exhaust purification catalyst 13 after injection by the injection patterns A, B, and C. Furthermore, FIG. 20 shows the $NO_x$ purification rate and amount of hydrocarbons passing straight through the exhaust purification catalyst 13 at the time of injection by the injection patterns A, B, and C.

Now, when the hydrogen concentration in the exhaust gas which flows into the exhaust purification catalyst 13, that is, the amount of hydrocarbons per unit amount of exhaust gas, is small, the hydrocarbons end up being completely oxidized at the exhaust purification catalyst 13. On the other hand, if the hydrogen concentration in the exhaust gas, that is, the amount of hydrocarbons per unit amount of exhaust gas, increases, in the exhaust purification catalyst 13, all of the hydrocarbons can no longer be completely oxidized. At this time, part of the hydrocarbons is partially oxidized. In this way, in the hydrogen concentration in the exhaust gas, there is a limit up to where all of the hydrocarbons are completely oxidized in the exhaust purification catalyst 13. This limit is shown in FIG. 20 by XA.

That is, in FIG. 20, when the hydrocarbon concentration is lower than the limit XA, all of the hydrocarbons is completely oxidized, so in FIG. 20, in the hatching region RA below the limit XA, all of the hydrocarbons is completely oxidized. In this case, the area of the hatching region RA expresses the amount of hydrocarbons. Therefore, the amount of hydrocarbons corresponding to the hatching region RA is completely oxidized. Note that, below, this limit RA is called the complete oxidation limit.

On the other hand, in FIG. 20, in the region RB above the complete oxidation limit RA, a partial oxidation action of hydrocarbons is performed in the exhaust purification catalyst 13. In this case, in FIG. 20, the hatching region RB expresses the amount of partially oxidized hydrocarbons. The reducing intermediate is produced from this partially oxidized hydrocarbons, so the $NO_x$ purification action is performed by the first $NO_x$ purification method by this partially oxidized hydrocarbon. Note that, in actuality, part of the partially oxidized hydrocarbons ends up being oxidized without being used for production of the reducing intermediate, while the remaining partially oxidized hydrocarbons are used to form the reducing intermediate.

On the other hand, if the hydrogen concentration in the exhaust gas which flows into the exhaust purification catalyst 13, that is, the amount of hydrocarbons per unit amount of exhaust gas, is further increased, part of the hydrocarbons is not completely oxidized in the exhaust purification catalyst 13 and further is not even partially oxidized. In this case, the part of the hydrocarbons not oxidized passes straight through the exhaust purification catalyst 13. This limit of hydrocarbons causing hydrocarbons to pass straight through is shown in FIG. 20 by XB. Below, this limit XB will be referred to as the pass through limit. In FIG. 20, the hatching region RC above this pass through limit XB expresses the amount of hydrocarbons passing straight through.

To remove $NO_x$ which is contained in exhaust gas using the first $NO_x$ purification method, it is necessary that a sufficient amount of hydrocarbons for the amount of $NO_x$ which is contained in the exhaust gas be partially oxidized. If the amount of partially oxidized hydrocarbons RB is insufficient, the $NO_x$ purification rate will fall. In FIG. 20, the injection pattern A shows the case where, in this way, the amount of partially oxidized hydrocarbons RB is insufficient. In this case, as shown in FIG. 20, the $NO_x$ purification rate falls.

On the other hand, in FIG. 20, the injection pattern B shows the case where the injection time is made longer than in the injection pattern A so as to increase the amount of partially oxidized hydrocarbons RB. If the injection time is made longer, the amount of partially oxidized hydrocarbons RB is increased, so, as shown in FIG. 20, the $NO_x$ purification rate becomes higher. Note that, FIG. 20 shows the case where even with the injection pattern B, the amount of partially oxidized hydrocarbons RB is somewhat insufficient.

In FIG. 20, the injection pattern C shows the case where to further increase the amount of partially oxidized hydrocarbons RB, the injection time is made longer compared with the injection pattern B. In this case, as shown in FIG. 20, the $NO_x$ purification rate is improved. However, in this case, the hydrocarbon concentration exceeds the pass through limit XB, so the hydrocarbons pass straight through.

When performing the $NO_x$ purification action by the first $NO_x$ purification method, it is necessary to prevent the hydrocarbons from passing straight through. Therefore, in the present invention, in the example shown in FIG. 20, the injection pattern B whereby the peak of the hydrocarbon concentration becomes the pass through limit XB is used. Of course, as shown in the injection pattern A, when a sufficiently high $NO_x$ purification rate is obtained even if the peak of the hydrocarbon concentration does not reach the pass through limit XB, the injection pattern A is used. That is, in the present invention, either of the injection pattern A or the injection pattern B is used.

Now, if the temperature of the exhaust purification catalyst 13 rises, the amount of hydrocarbons which is oxidized at the exhaust purification catalyst 13 per unit time increases, that is, the oxidation speed at the hydrocarbons increases. As a result, if the temperature of the exhaust purification catalyst 13 rises, the complete oxidation limit XA rises. On the other hand, if the temperature of the exhaust purification catalyst 13 rises, the hydrocarbons which passed through before the temperature rose become partially oxidized, so the pass through limit XB also rises. That is, if the temperature of the exhaust purification catalyst 13 rises, both the complete oxidation limit XA and the pass through limit XB rise. Therefore, when using the first $NO_x$ purification method for removal of the $NO_x$, it is necessary to consider this for control of injection of the hydrocarbons.

FIG. 21 to FIG. 28 show a first embodiment which considers this for control of injection of the hydrocarbons. Note that, in this first embodiment, the injection pressure is maintained constant, and the injection amount of hydrocarbons is controlled under a constant injection pressure by controlling the injection time.

Figure 21:
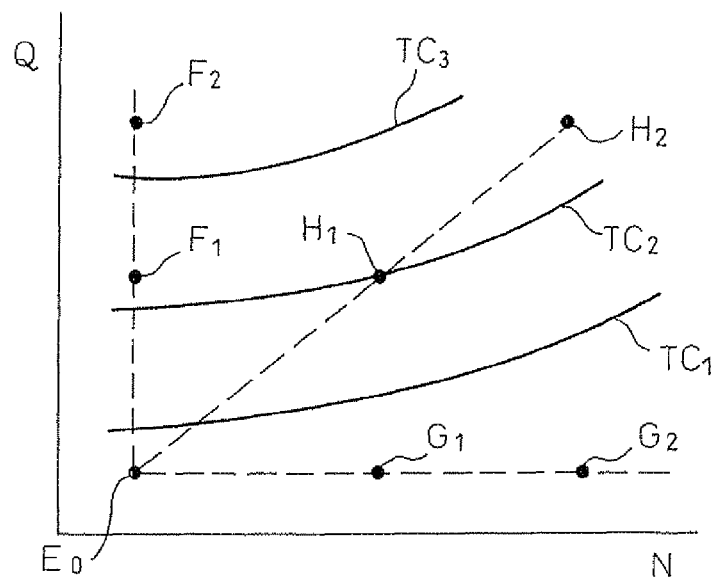
FIG. 21 is a view showing the temperature of the exhaust purification catalyst.

First, explaining FIG. 21, FIG. 21 shows a typical example of the temperatures $TC_1$, $TC_2$, and $TC_3$ ($TC_3 > TC_2 > TC_1$) of the exhaust purification catalyst 13 at the time of steady operation. Note that, in FIG. 21, the ordinate Q shows the fuel injection amount into the combustion chamber 2, while the abscissa shows the engine speed. As will be understood from FIG. 21, when the engine speed N is the same, the greater the injection amount Q, that is, the higher the engine load, the higher the temperature of the exhaust purification catalyst 13. When the fuel injection amount Q is the same, that is, when the engine load is the same, the greater the engine speed N, that is, the greater the intake air amount, the more the temperature of the exhaust purification catalyst 13 falls somewhat.

In this way, the temperature of the exhaust purification catalyst 13 changes in accordance with the operating state of the engine. On the other hand, the amount of $NO_x$ which is exhausted from the engine per unit time increases the higher the engine load and increases the higher the engine speed. Therefore, these are taken into consideration to determine the injection time of hydrocarbons.

Figure 22:
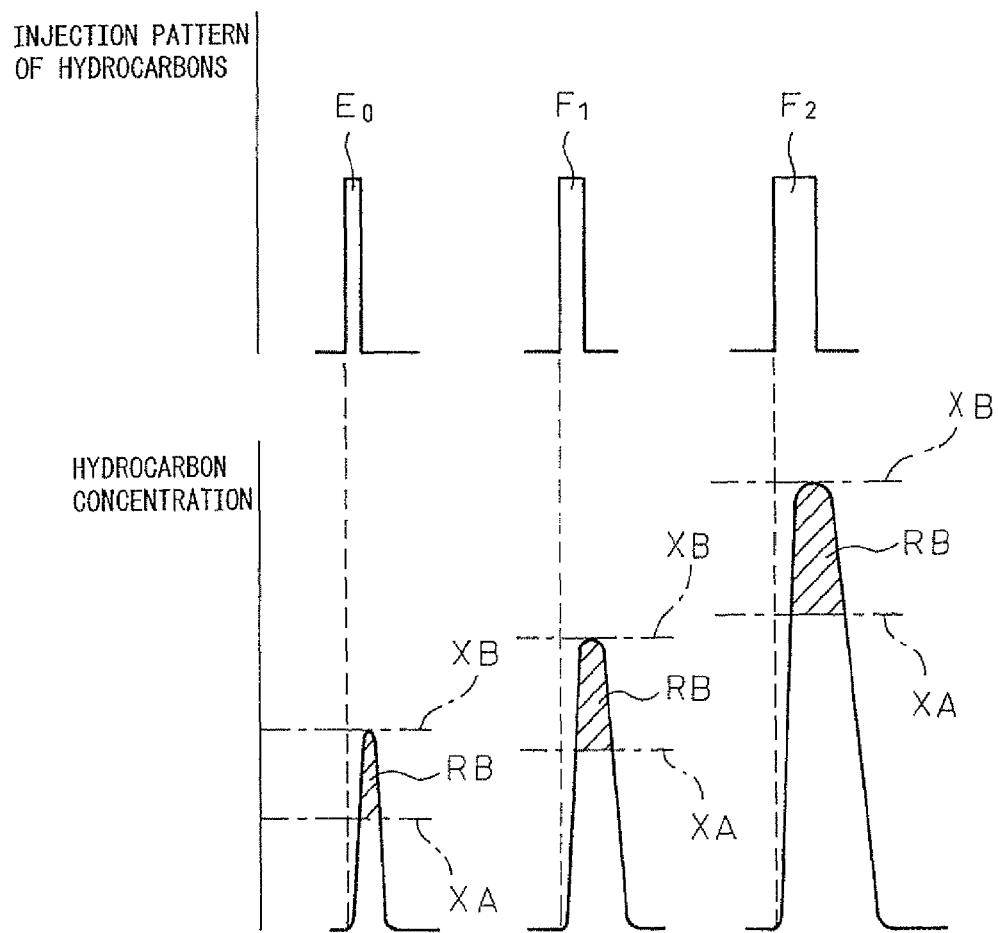
FIG. 22 is a view showing changes of an injection pattern of hydrocarbons from a hydrocarbon feed valve and a hydrocarbon concentration in the exhaust gas flowing into the exhaust purification catalyst.

FIG. 22 shows the injection patterns at the time of steady operation at $E_0$, $F_1$, and $F_2$ of FIG. 21, that is, at the same speed and different loads. That is, under the same speed, the higher the load, the higher the temperature of the exhaust purification catalyst 13 becomes and, therefore, the higher the complete oxidation limit XA and pass through limit XB become as well. On the other hand, under the same speed, the higher the load, the greater the amount of $NO_x$ exhausted from the engine and, therefore, at this time, the higher the load, the greater the amount RB of partially oxidized hydrocarbons has to be made. Therefore, at this time, in the first embodiment, as shown in FIG. 22, the higher the load, the greater the injection time is made so that the peak of hydrocarbon concentration becomes the pass through limit XB.

Figure 23:
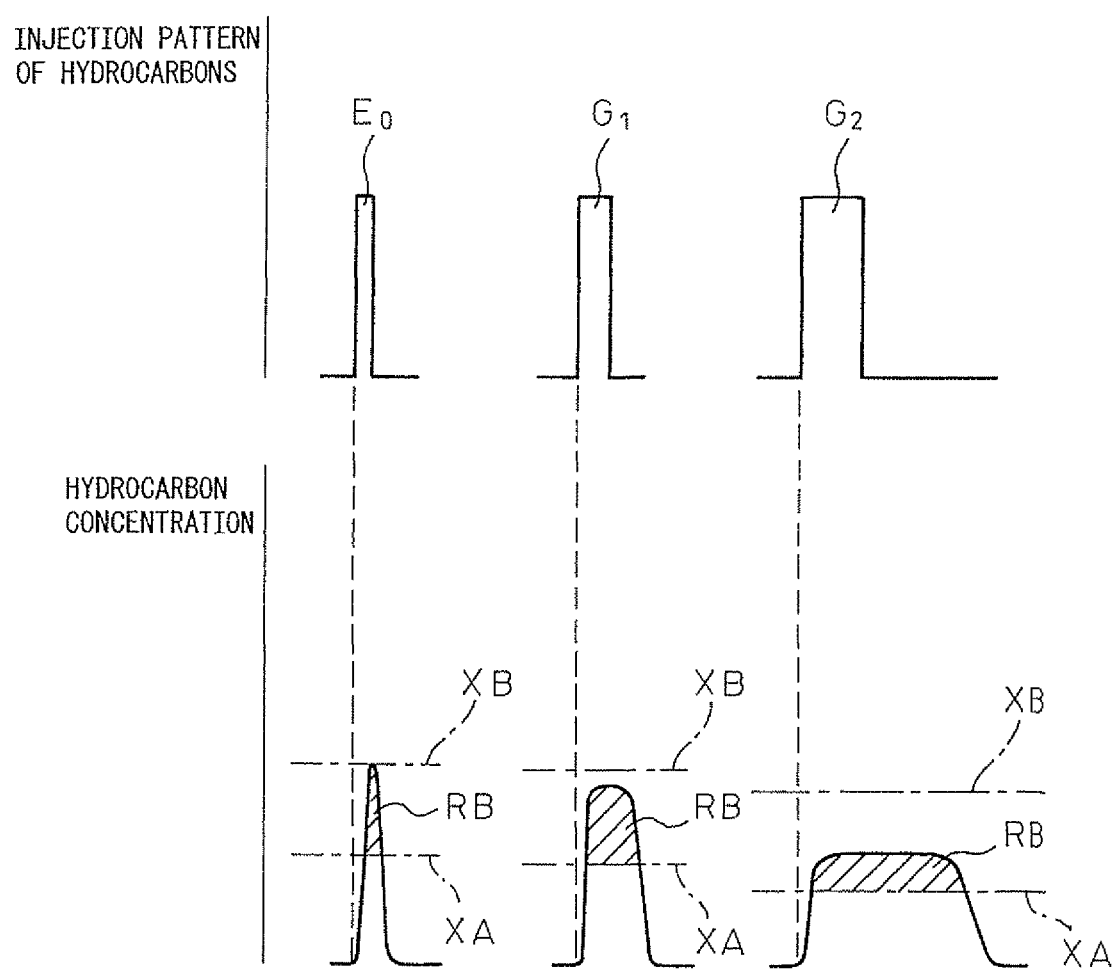
FIG. 23 is a view showing changes of an injection pattern of hydrocarbons from a hydrocarbon feed valve and a hydrocarbon concentration in the exhaust gas flowing into the exhaust purification catalyst.

FIG. 23 shows the injection patterns at the time of steady operation at $E_0$, $G_1$, and $G_2$ of FIG. 21, that is, at the same load and different speeds. That is, under the same load, the higher the speed, the more the temperature of the exhaust purification catalyst 13 falls somewhat and, therefore, the more the complete oxidation limit XA and pass through limit XB fall somewhat. On the other hand, under the same load, the higher the speed, the greater the amount of $NO_x$ exhausted from the engine per unit time. Therefore, at this time as well, the higher the speed, the greater the amount RB of partially oxidized hydrocarbons.

On the other hand, the higher the speed, the faster the flow rate of the exhaust gas, and the injected hydrocarbons are diffused in a large amount of exhaust gas. Therefore, as shown in FIG. 23, the peak of the hydrocarbon concentration when the amount of partially oxidized hydrocarbons required for removal of $NO_x$ is produced falls the higher the speed. In this first embodiment, the injection time is made longer as the speed becomes higher so that the amount of partially oxidized hydrocarbons required for removal of $NO_x$ can be produced.

Figure 24:
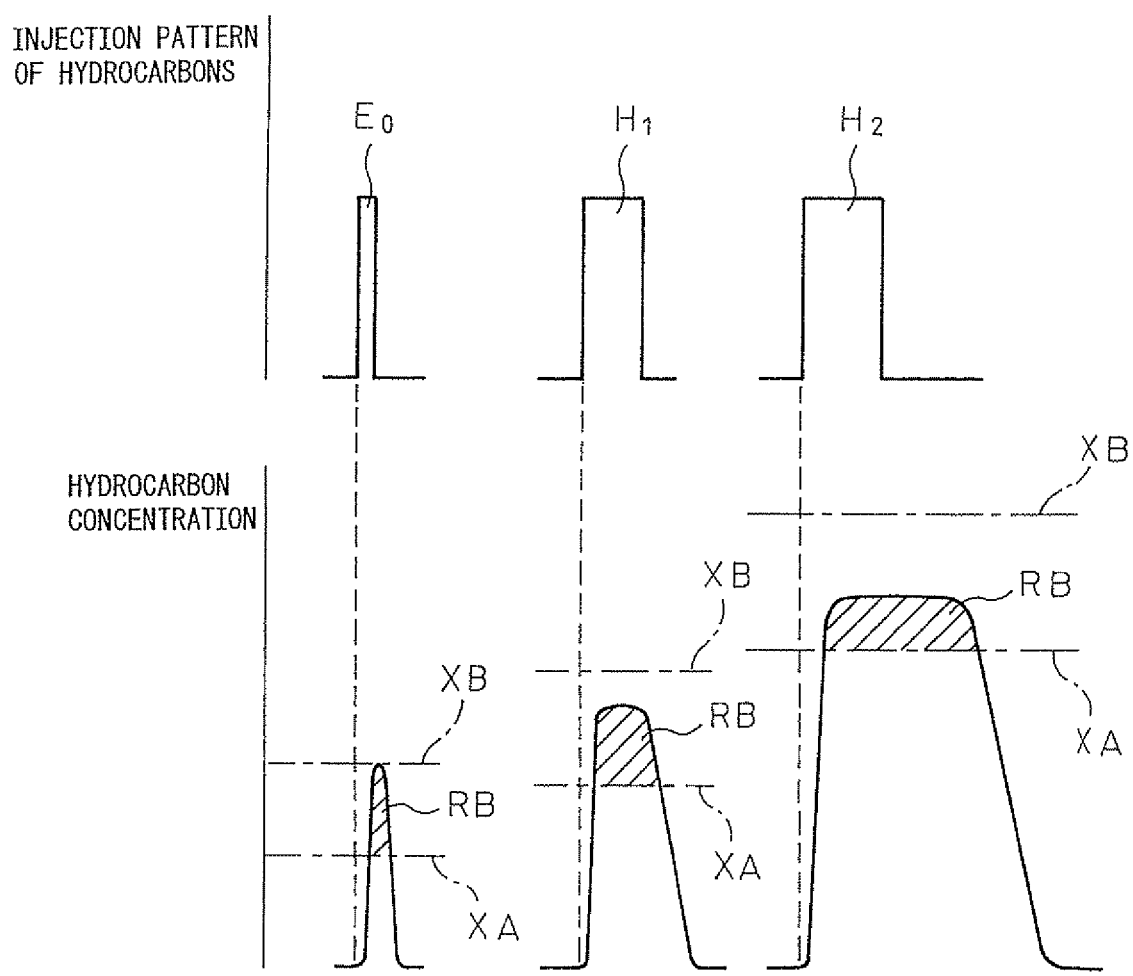
FIG. 24 is a view showing changes of an injection pattern of hydrocarbons from a hydrocarbon feed valve and a hydrocarbon concentration in the exhaust gas flowing into the exhaust purification catalyst.

FIG. 24 shows the injection patterns at the time of steady operation at $E_0$, $H_1$, and $H_2$ of FIG. 21. That is, as the speed and load become higher, the temperature of the exhaust purification catalyst 13 becomes higher and, therefore, the complete oxidation limit XA and pass through limit XB also become higher. On the other hand, the higher the speed and the load, the greater the amount of $NO_x$ exhausted per unit time from the engine. Therefore, at this time, the higher the speed and load, the greater the amount RB of partially oxidized hydrocarbons has to be made. Therefore, in the first embodiment, as shown in FIG. 24, the injection time is made longer as the speed and load become higher so as to enable the production of the amount of partially oxidized hydrocarbons required for removal of $NO_x$.

Figure 25A:
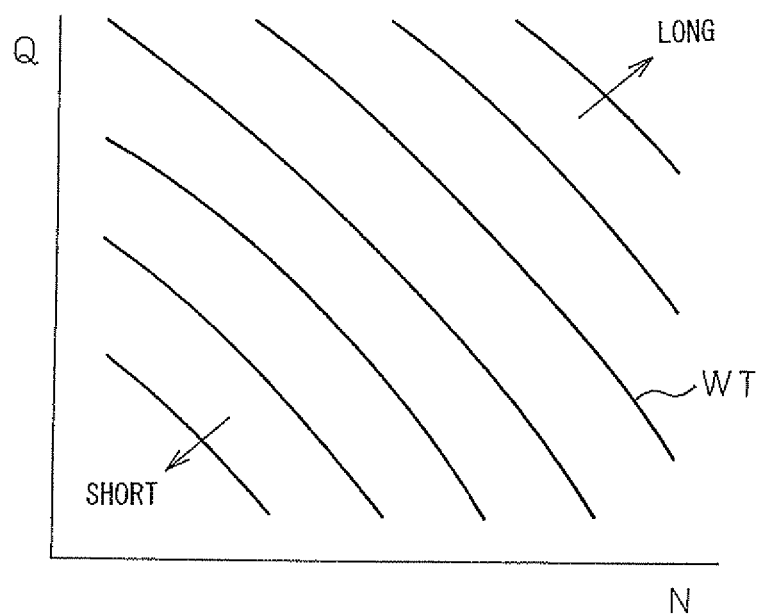
FIG. 25A and FIG. 25B are views showing an injection time of hydrocarbons.
Figure 25B:
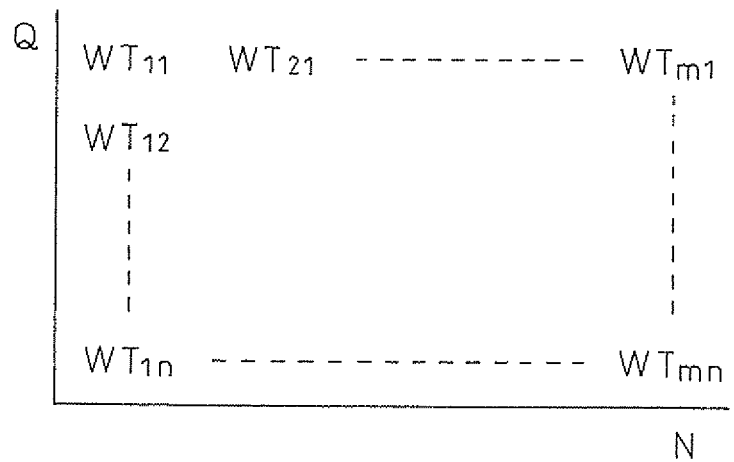

FIG. 25A shows the equivalent injection time lines enabling production of the amount of partially oxidized hydrocarbons required for removal of $NO_x$ at the time of steady operation. As will be understood from FIG. 25A, the injection time of hydrocarbons becomes longer the larger the fuel injection amount Q, that is, the larger the engine load, and the higher the engine speed N. This injection time WT is stored as a function of the fuel injection amount Q and engine speed N in the form of a map such as shown in FIG. 25B in advance in the ROM 32. Further, the optimum vibration amplitude ΔT of the hydrocarbon concentration, that is, the injection period ΔT of the hydrocarbons is similarly stored as a function of the injection amount Q and engine speed N in the form of a map in advance in the ROM 32.

At the time of engine steady operation, if hydrocarbons are injected from the hydrocarbon feed valve 15 at the injection time WTij shown in FIGS. 25A and 25B, the $NO_x$ is removed well. That is, the injection time Wij shown in FIGS. 25A and 25B shows the injection time serving as a reference for good removal of $NO_x$ by the first $NO_x$ purification method. Therefore, below, the injection time WTij shown in FIGS. 25A and 25B will be referred to as the reference injection time.

In this way, at the time of engine steady operation, the injection time can be made the reference injection time WTij shown in FIGS. 25A and 25B so as to perform a good $NO_x$ purification action by the first $NO_x$ purification method. However, if the injection time is made the reference injection time Wij determined by the engine operating state at the time of transition operation, the $NO_x$ purification rate falls or the pass through of the hydrocarbons occurs. Next, this will be explained with reference to FIG. 26.

Figure 26:
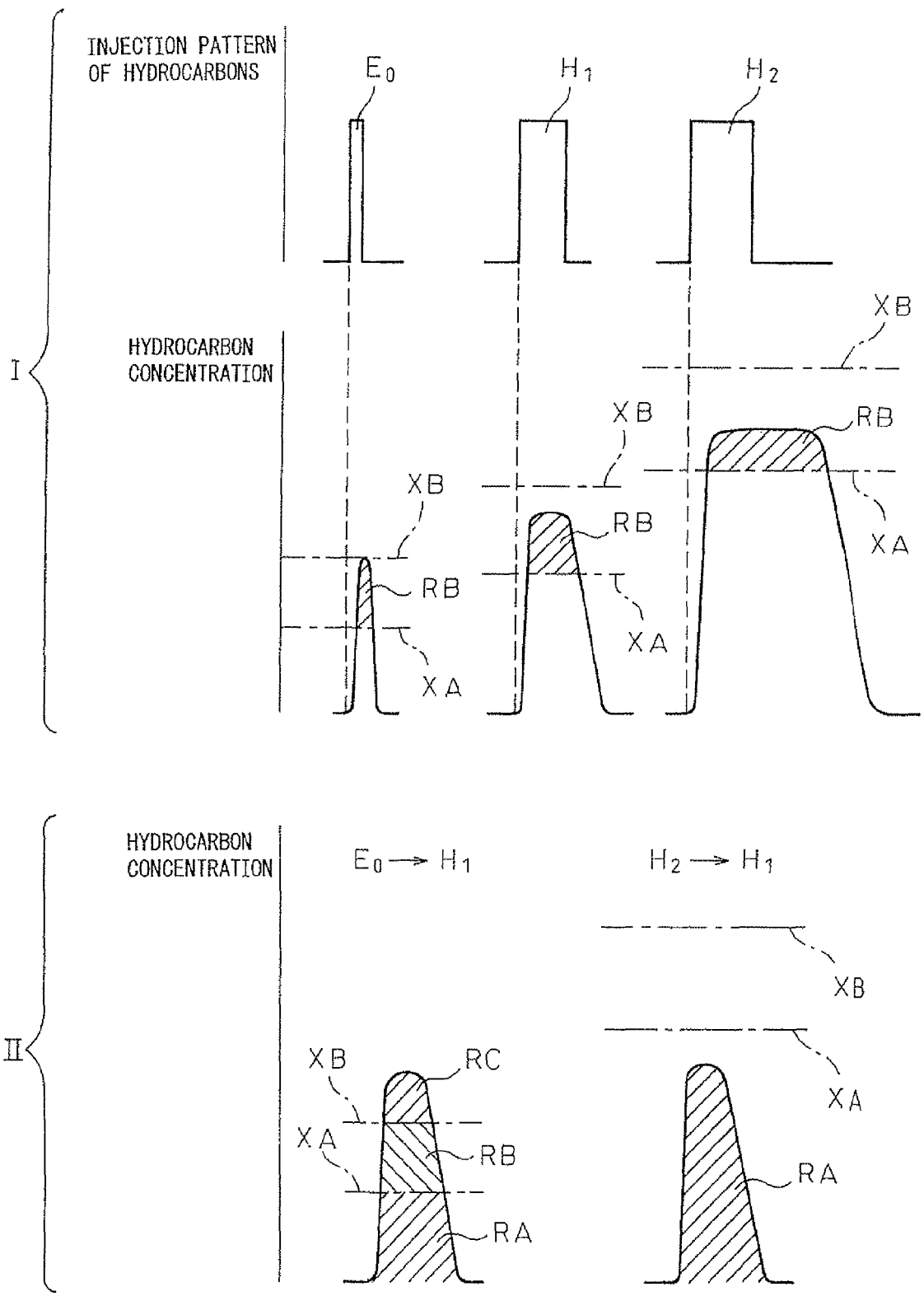
FIG. 26 is a view showing changes of an injection pattern of hydrocarbons from a hydrocarbon feed valve and a hydrocarbon concentration in the exhaust gas flowing into the exhaust purification catalyst.

The part of I of FIG. 26 is the same as in FIG. 24. Therefore, the part of I of FIG. 26 shows the injection patterns $E_0$, $H_1$, and $H_2$ giving good $NO_x$ purification rates when steady operation is being performed at the points $E_0$, $H_1$, and $H_2$ of FIG. 21. On the other hand, the part of II of FIG. 26 shows when the engine operating state changes from the point $E_0$ to the point $H_1$ of FIG. 21 and the injection pattern is switched from the injection pattern $E_0$ to the injection pattern $H_1$ shown by the part of I of FIG. 26 and when the engine operating state changes from the point $H_2$ to the point $H_1$ of FIG. 21 and the injection pattern is switched from the injection pattern $H_2$ to the injection pattern $H_1$ shown by the part of I of FIG. 26.

At FIG. 21, when steady operation is performed at the $E_0$ point, the temperature of the exhaust purification catalyst 13 is low. At FIG. 21, when steady operation is performed at the $H_1$ point, the temperature of the exhaust purification catalyst 13 becomes high. However, even if the engine operating state changes from the $E_0$ point to the $H_1$ point of FIG. 21, the temperature of the exhaust purification catalyst 13 does not immediately rise. Therefore, at this time, the complete oxidation limit XA and the pass through limit XB become about the heights of the time of the E point. Therefore, when the engine operating state becomes the $H_1$ point, if the injection pattern $H_1$ is used for injection, as shown by the ($E_0 \rightarrow H_1$) of the part of II of FIG. 26, the amount of partially oxidized hydrocarbons RB becomes an amount sufficient for removal of $NO_x$, but the pass through amount RC becomes considerably large. That is, at this time, hydrocarbons pass straight through.

On the other hand, when a steady operation is performed at the $H_2$ point of FIG. 21, the temperature of the exhaust purification catalyst 13 becomes further higher. However, in this case, even if the engine operating state changes from the $H_2$ point to the $H_1$ point of FIG. 21, the temperature of the exhaust purification catalyst 13 does not immediately fall. Therefore, at this time, the complete oxidation limit XA and pass through limit XB are about the heights of the time of the $H_2$ point. Therefore, when the engine operating state is the $H_1$ point, if injection is performed by the injection pattern $H_1$, the peak of the hydrocarbon concentration becomes the complete oxidation limit XA or less as shown by the ($H_2 \rightarrow H_1$) of the part of II of FIG. 26. Therefore, at this time, all of the hydrocarbons are completely oxidized and no $NO_x$ purification action is performed at all.

Therefore, in the present invention, to enable $NO_x$ to be removed well even in such a transition state, the injection time of hydrocarbons is corrected in accordance with the temperature of the exhaust purification catalyst 13. Next, this will be explained with reference to FIG. 27.

Figure 27:
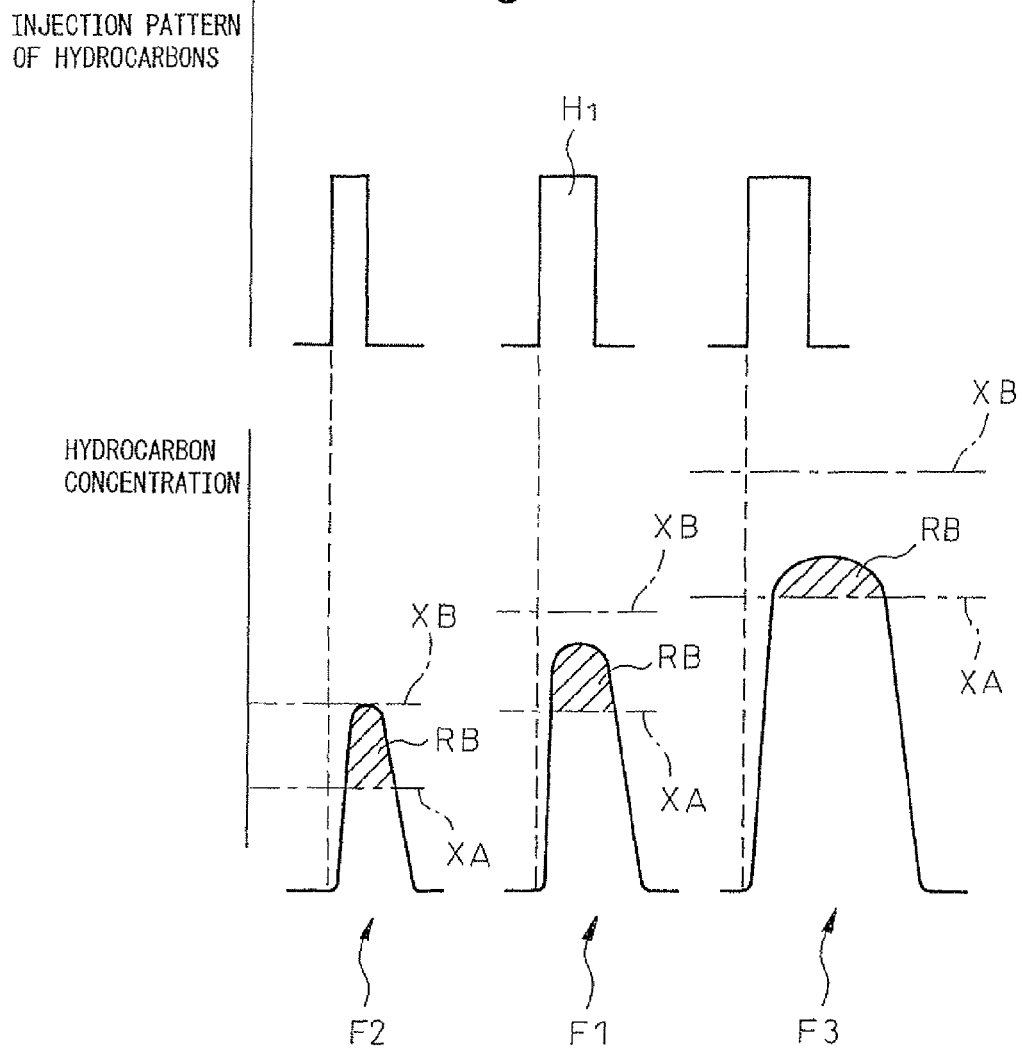
FIG. 27 is a view showing changes of an injection pattern of hydrocarbons from a hydrocarbon feed valve and a hydrocarbon concentration in the exhaust gas flowing into the exhaust purification catalyst.

FIG. 27 shows the time when the engine operating state is at the point $H_1$ of FIG. 21. $H_1$ of FIG. 27 shows the injection pattern at the time of steady operation at the point $H_1$. When a steady operation is being performed and the injection pattern $H_1$ is being used for injection of hydrocarbons, a sufficient amount RB of partially oxidized hydrocarbons is produced for removing the $NO_x$. Therefore, at this time, the $NO_x$ is removed well.

As opposed to this, when the engine operating state is, for example, changed from the $E_0$ point to the $H_1$ point of FIG. 21, as explained before, the temperature of the exhaust purification catalyst 13 is low, therefore, as shown by F2 in FIG. 27, the complete oxidation limit XA and pass through limit XB become lower. However, even in this case, the same amount of $NO_x$ as at the time of steady operation shown by F1 is exhausted from the engine, so even in the case shown by F2, the same amount of partially oxidized hydrocarbons as at the time of steady operation shown by F1 has to be produced. Therefore, in the case shown by F2, the injection time is made shorter so that the same amount of partially oxidized hydrocarbons as at the time of steady operation shown by F1 can be produced.

On the other hand, when the engine operating state is, for example, changed from the $H_2$ point to the $H_1$ point of FIG. 21, as explained before, the temperature of the exhaust purification catalyst 13 is high, therefore, as shown by F3 in FIG. 27, the complete oxidation limit XA and pass through limit XB become higher. However, even in this case, the same amount of $NO_x$ as at the time of steady operation shown by F1 is exhausted from the engine, so even in the case shown by F3, the same amount of partially oxidized hydrocarbons as at the time of steady operation shown by F1 has to be produced. Therefore, in the case shown by F3, the injection time is made longer so that the same amount of partially oxidized hydrocarbons as at the time of steady operation shown by F1 is can be produced.

In the first embodiment of the present invention, the injection time at the time of steady operation, that is, the reference injection time WT, is multiplied with a correction value K to correct the injection time so as to produce the same amount RB of partially oxidized hydrocarbons as at the time of steady operation. This correction value K, as shown in FIG. 28, is stored in advance as a function of the difference (TC-TCi) between the actual temperature TC of the exhaust purification catalyst 13 and the temperature of the exhaust purification catalyst 13 at the steady operation state, that is, the reference temperature TCi.

Figure 28:
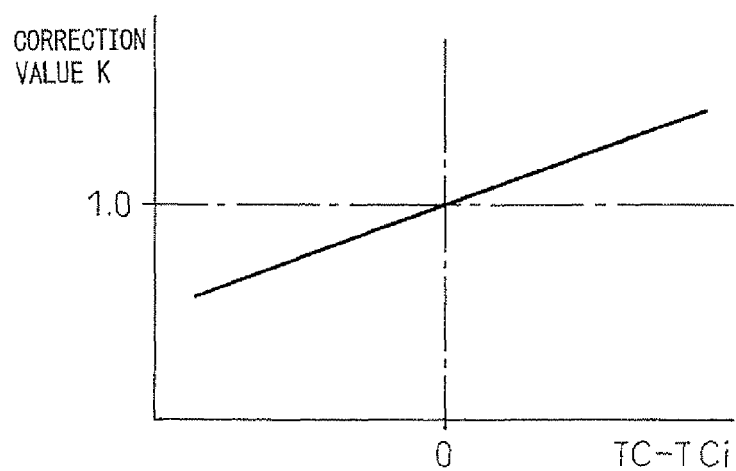
FIG. 28 is a view showing a correction value K.

As will be understood from FIG. 28, when the actual temperature TC of the exhaust purification catalyst 13 is the temperature of the exhaust purification catalyst 13 at the steady operation state, that is, the reference temperature TCi, the correction value K becomes 1.0, so at this time, the injection time is made the reference injection time WT at the steady operation state. As opposed to this, when the temperature TC of the exhaust purification catalyst 13 is higher than the reference temperature TCi, the correction value K becomes larger than 1.0, so the injection time is made longer. When the temperature TC of the exhaust purification catalyst 13 is lower than the reference temperature TCi, the correction value K becomes smaller than 1.0, so the injection time is made smaller. Note that for the relationship of the correction value K and the temperature difference (TC-TCi), it is possible to use the relationship shown in FIG. 28 common for all operating states. It is also possible to find the relationship between the correction value K and the temperature difference (TC-TCi) for each operating state and use the relationship between the correction value K and the temperature difference (TC-TCi) in accordance with the operating state.

The representative reference temperatures of the exhaust purification catalyst 13 at the time of steady operation are shown by $TC_1$, $TC_2$, and $TC_3$. The reference temperatures TCi in the different operating state are stored in advance in the ROM 32. Further, the actual temperature TC of the exhaust purification catalyst 13 is detected by the temperature sensor 26.

Figure 29:
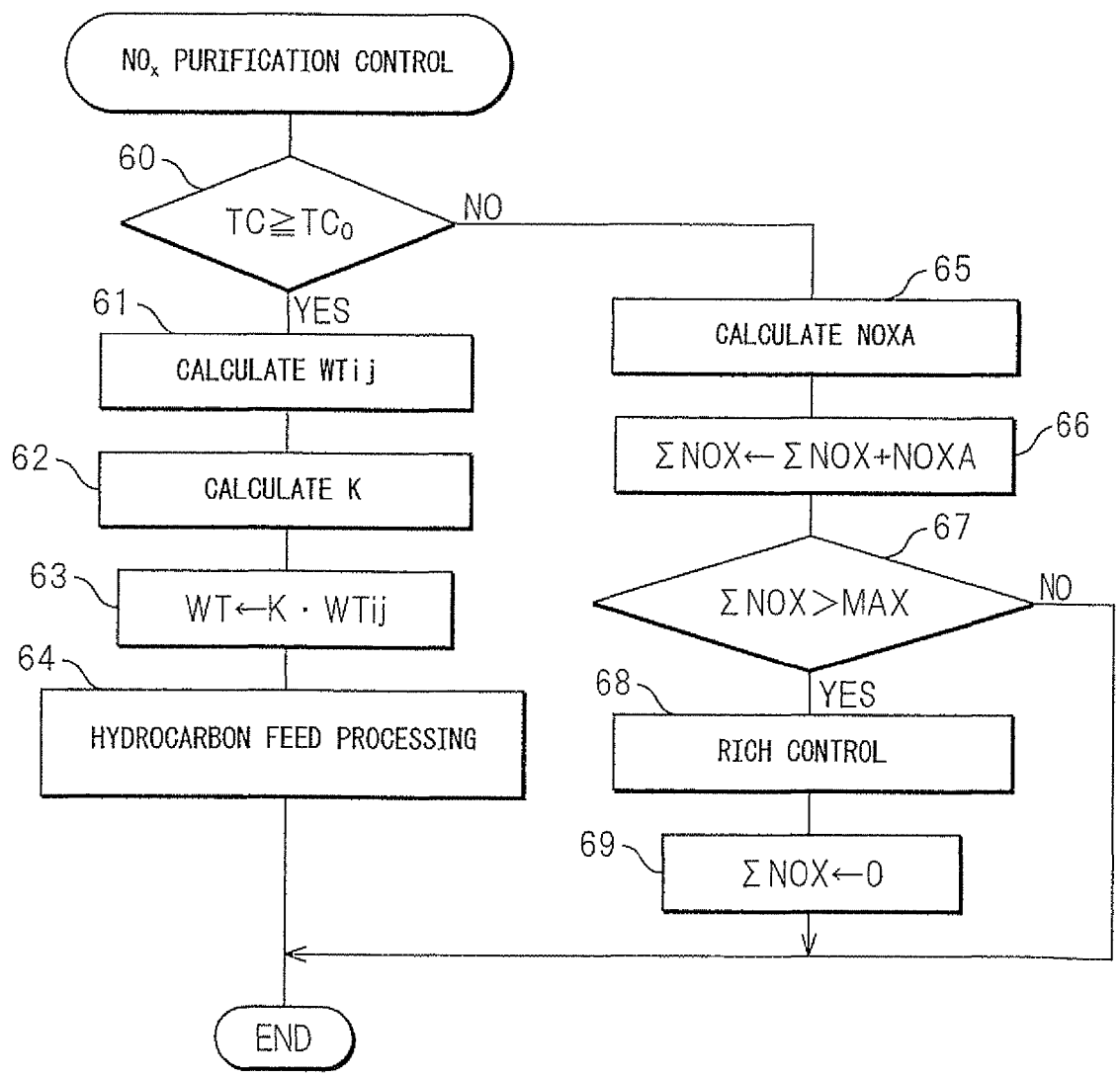
FIG. 29 is a flow chart for $NO_x$ purification control.

FIG. 29 shows the $NO_x$ purification control routine. This routine is executed by interruption every predetermined time.

Referring to FIG. 29, first, at step 60, it is judged from the output signal of the temperature sensor 23 if the temperature TC of the exhaust purification catalyst 13 exceeds the activation temperature $TC_0$. When $TC \geq TC_0$, that is, when the exhaust purification catalyst 13 is activated, the routine proceeds to step 61 where the $NO_x$ purification action by the first $NO_x$ purification method is performed.

That is, first, at step 61, the reference injection time WTij is calculated from the map shown in FIG. 25B. Next, at step 62, the correction value K is calculated from the relationship shown in FIG. 28. Next, at step 63, the final injection time WT(=K·WTij) is calculated. Next, at step 64, this final injection time WT is used as the basis for feed control of the hydrocarbons from the hydrocarbon feed valve 15.

On the other hand, when it is judged at step 60 that $TC<TC_0$, it is judged that the second $NO_x$ purification method should be used, then the routine proceeds to step 65. At step 65, the $NO_x$ amount NOXA of $NO_x$ exhausted per unit time is calculated from the map shown in FIG. 17. Next, at step 66, $\Sigma NO_x$ is increased by the exhausted $NO_x$ amount NOXA to calculate the stored $NO_x$ amount $\Sigma NO_x$. Next, at step 67, it is judged if the stored $NO_x$ amount $\Sigma NO_x$ exceeds the allowable value MAX. When $\Sigma NO_x > MAX$, the routine proceeds to step 68 where the additional fuel amount WR is calculated from the map shown in FIG. 19 and an injection action of additional fuel is performed. Next, at step 69, $\Sigma NO_x$ is cleared.

Next, referring to FIG. 30 to FIG. 36, a second embodiment of the present invention will be explained. In this second embodiment, when controlling injection of hydrocarbons from the hydrocarbon feed valve 15, the injection pressure is controlled in addition to the injection time. Specifically speaking, the injection time and injection pressure of the hydrocarbons are controlled so that the amount RB of partially oxidized hydrocarbons demanded in accordance with the engine operating state is secured and the peak of the hydrocarbon concentration matches the pass through limit XB.

Now, at $E_0$, $F_1$, and $F_2$ of FIG. 21, as shown by FIG. 22, the peak of the hydrocarbon concentration is made to match the pass through limit XB by changing just the injection time. Therefore, in this case, the injection pressure is not particularly made to change.

Figure 30:
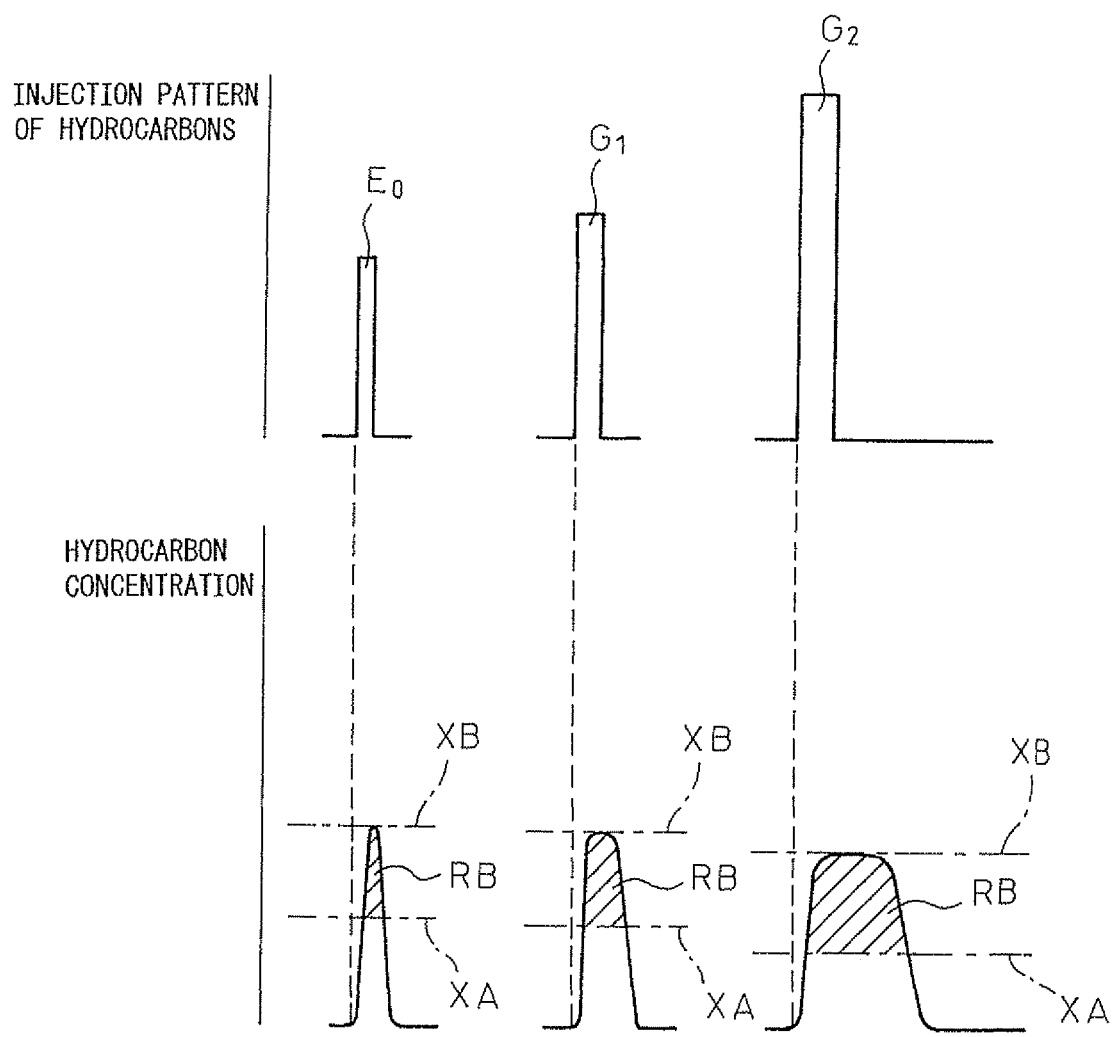
FIG. 30 is a view showing changes of an injection pattern of hydrocarbons from a hydrocarbon feed valve and a hydrocarbon concentration in the exhaust gas flowing into the exhaust purification catalyst.

As opposed to this, at $E_0$, $G_1$, and $G_2$ of FIG. 21, as shown by FIG. 23, the peak of the hydrocarbon concentration does not reach the pass through limit XB even if changing just the injection time. Therefore, in this second embodiment, at $E_0$, $G_1$, of $G_2$ of FIG. 21, as shown by FIG. 30, the injection pressure is made higher the higher the engine speed so that the peak of the hydrocarbon concentration matches the pass through limit XB. On the other hand, if the injection pressure is made higher, the injection time required for securing the demanded partially oxidized amount RB becomes shorter. This will be understood well by, for example, comparison of $G_2$ of FIG. 23 and $G_2$ of FIG. 30.

FIG. 31 shows the injection pattern at the time of normal operation at $E_0$, $H_1$, and $H_2$ of FIG. 21. From FIG. 31, it is learned that in this second embodiment, the higher the engine speed and load, the higher the injection pressure is made. Further, as will be understood from a comparison with FIG. 24, in this case as well, at the $H_1$ and $H_2$ points, the injection time becomes shorter. If the injection time becomes shorter, the amount of completely oxidized hydrocarbons is reduced, so there is the advantage that it is possible to improve the fuel efficiency.

Figure 32A:
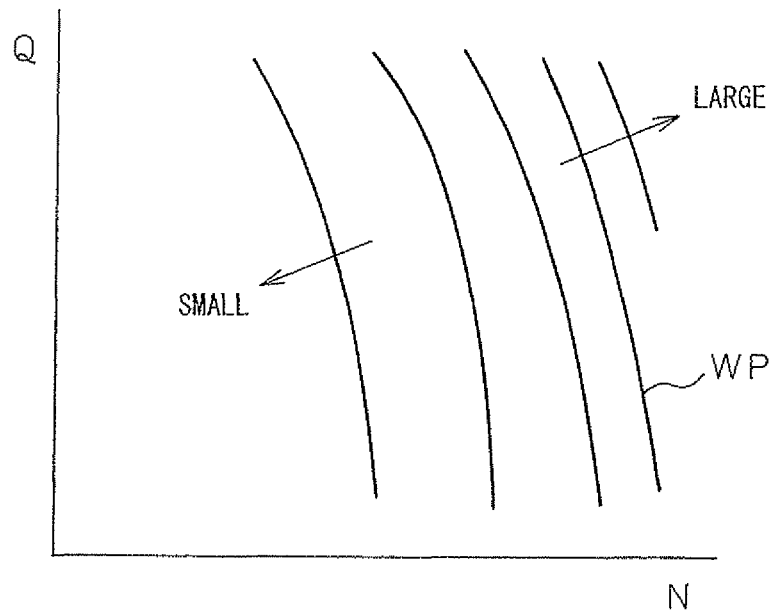
FIGS. 32A and 32B are views showing an injection pressure of hydrocarbons.
Figure 32B:
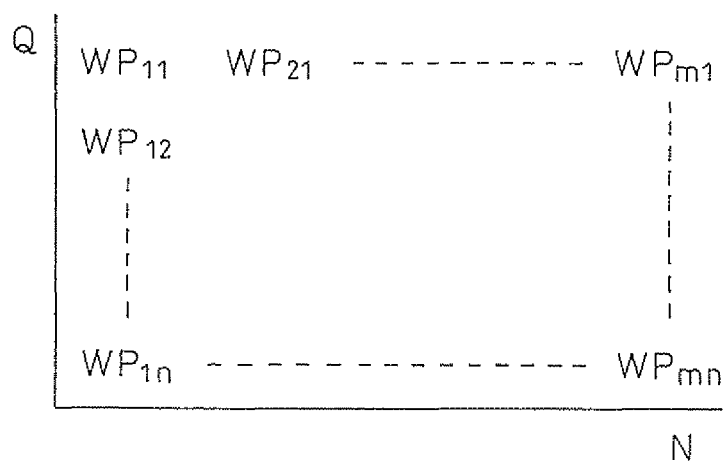
Figure 33A:
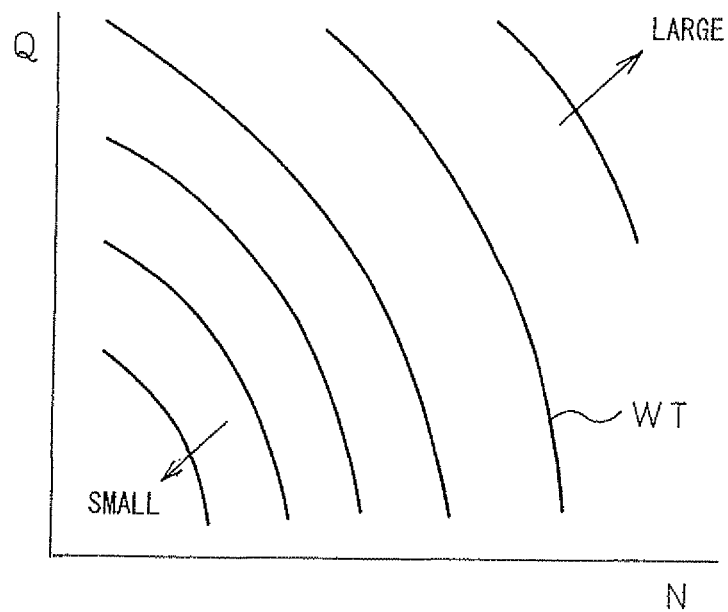
FIGS. 33A and 33B are views showing an injection time of hydrocarbons.
Figure 33B:
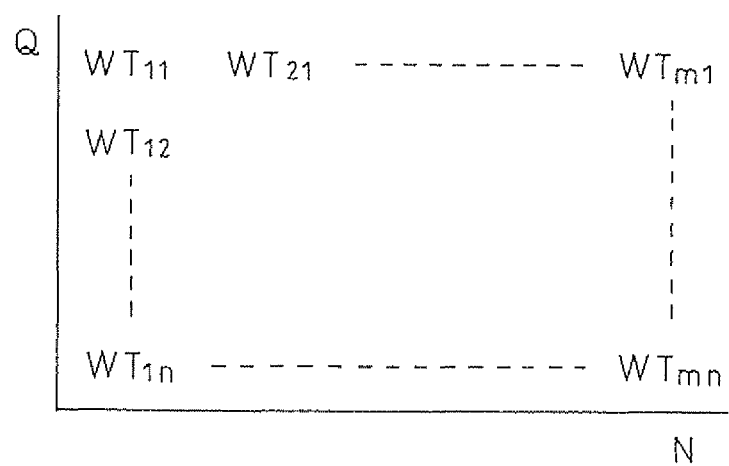

The equivalent injection pressure lines WP and the equivalent injection time lines WT able to produce the amount of partially oxidized hydrocarbons necessary for removal of $NO_x$ at the time of steady operation are respectively shown in FIGS. 32A and 33A. As will be understood from FIG. 32A and FIG. 33A, the injection pressure WP of hydrocarbons and injection time WT become larger the more the fuel injection amount Q is increased, that is, the more the engine load is increased, and become larger the higher the engine speed N. These injection pressure WP and injection time WT are stored as functions of the fuel injection amount Q and engine speed N in the forms of maps such as shown in FIG. 32B and FIG. 33B in advance in the ROM 32. Further, the optimum vibration amplitude ΔT of the hydrocarbon concentration, that is, the injection period ΔT of the hydrocarbons, is similarly stored as a function of the injection amount Q and engine speed N in the form of a map in advance in the ROM 32.

At the time of engine steady operation, if hydrocarbons are injected from the hydrocarbon feed valve 15 by the injection pressure WPij shown in FIG. 32B and the injection time WTij shown in FIG. 33B, the $NO_x$ is removed well. That is, the injection pressure WPij and injection time Wij shown in FIGS. 32B and 33B show the injection pressure and injection time becoming the reference for good removal of $NO_x$ by the first $NO_x$ purification method. Therefore, below, the injection pressure WPij shown in FIG. 32B is referred to as the reference injection pressure, while the injection time WTij shown in FIG. 33B is referred to as the reference injection time.

In this way, at the time of engine steady operation, by making the injection pressure the reference injection pressure Wij shown in FIG. 32B and making the injection time the reference injection time WTij shown in FIG. 33B, it is possible to perform a good $NO_x$ purification action by the first $NO_x$ purification method. However, if making the injection pressure and injection time the fixed reference injection pressure WPij and reference injection time Wij of the engine at the time of transition operation, the $NO_x$ purification rate will fall or pass through of the hydrocarbons will end up occurring.

Therefore, in the present invention, to enable the $NO_x$ to be removed well even in such a transition state, the injection pressure and injection time of hydrocarbons are corrected in accordance with the temperature of the exhaust purification catalyst 13. Next, this will be explained with reference to FIG. 34.

Figure 34:
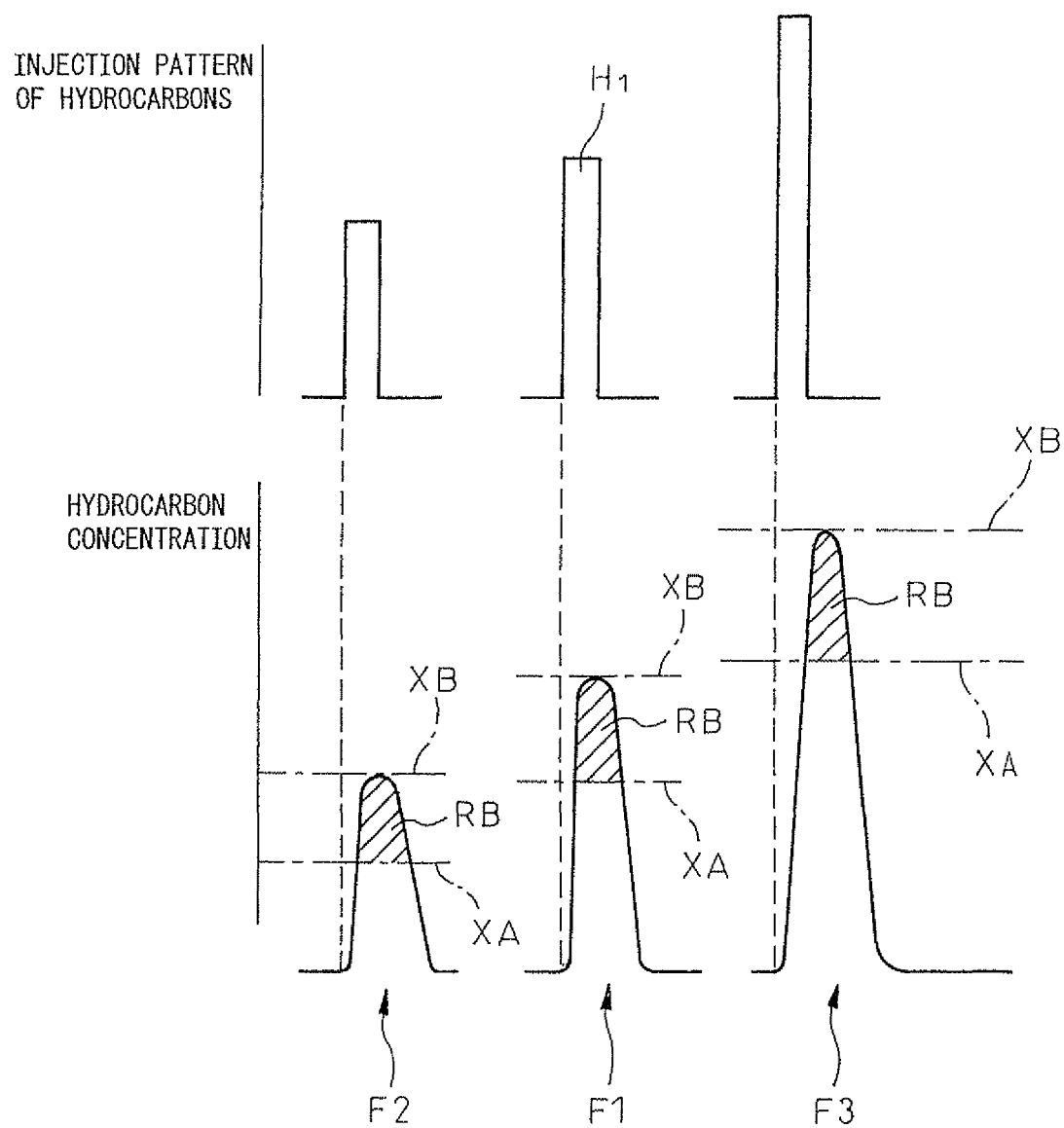
FIG. 34 is a view showing changes of an injection pattern of hydrocarbons from a hydrocarbon feed valve and a hydrocarbon concentration in the exhaust gas flowing into the exhaust purification catalyst.

FIG. 34 shows the time when the engine operating state is at the point $H_1$ of FIG. 21. $H_1$ of FIG. 34 shows the injection pattern when steady operation is performed at the point $H_1$. When steady operation is being performed and the injection pattern $H_1$ is used for injection of hydrocarbons, a sufficient amount RB of partially oxidized hydrocarbons is produced for removing the $NO_x$. Therefore, at this time, $NO_x$ is removed well.

As opposed to this, when the engine operating state is, for example, made to change from the $E_0$ point to the $H_1$ point of FIG. 21, the temperature of the exhaust purification catalyst 13 is low. Therefore, as shown by F2 of FIG. 34, the complete oxidation limit XA and pass through limit XB become lower. However, in this case as well, the same amount of $NO_x$ as at the time of steady operation shown at F1 is exhausted from the engine, so even in the case shown by F2, the same amount RB of partially oxidized hydrocarbons as at the time of steady operations shown by F1 has to be produced. Therefore, in the case shown by F2, the injection pressure is made lower and the injection time is made somewhat longer so that the same amount RB of partially oxidized hydrocarbons as at the time of steady operations shown by F1 can be produced.

On the other hand, when the engine operating state is, for example, changed from the $H_2$ point to the $H_1$ point of FIG. 21, the temperature of the exhaust purification catalyst 13 is high. Therefore, as shown by F3 of FIG. 34, the complete oxidation limit XA and pass through limit XB become higher. However, in this case as well, the same amount of $NO_x$ as at the time of steady operation shown at F1 is exhausted from the engine, so even in the case shown by F3, the same amount RB of partially oxidized hydrocarbons as at the time of steady operations shown by F1 has to be produced. Therefore, in the case shown by F3, the injection pressure is made higher and the injection time is made somewhat shorter so that the same amount RB of partially oxidized hydrocarbons as at the time of steady operations shown by F1 can be produced.

In this second embodiment, the injection pressure at the time of steady operation, that is, the reference injection pressure WP, is multiplied with a correction value KP and, the injection time at the time of steady operation, that is, the reference injection time WT, is multiplied with a correction value KT, to correct the injection pressure and injection time so as to produce the same amount RB of partially oxidized hydrocarbons as at the time of steady operation.

Figure 35A:
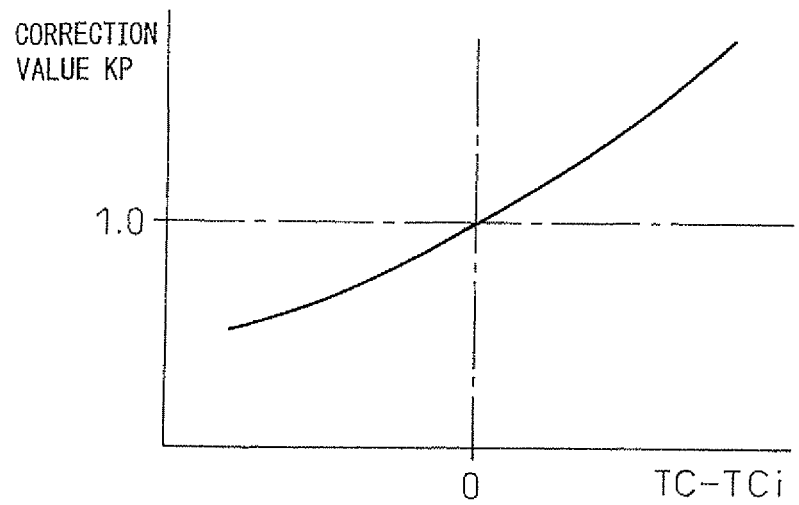
FIG. 35A and FIG. 35B are views showing correction values KP and KT.
Figure 35B:
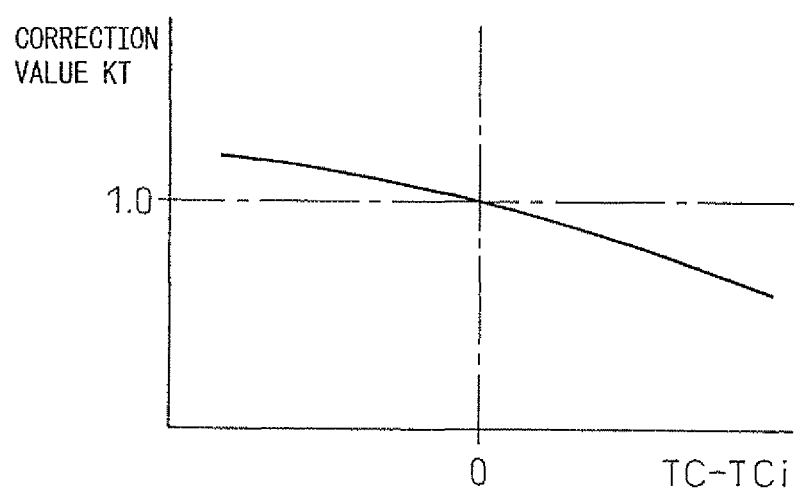

In this case, the correction value KP, as shown in FIG. 35A, is also stored in advance as a function of the difference (TC-TCi) between the actual temperature TC of the exhaust purification catalyst 13 and the temperature of the exhaust purification catalyst 13 at the steady operation state, that is, the reference temperature TCi, while the correction value KT, as shown in FIG. 35B, is also stored in advance as a function of the difference (TC-TCi) between the actual temperature TC of the exhaust purification catalyst 13 and the temperature of the exhaust purification catalyst 13 at the steady operation state, that is, the reference temperature TCi.

As will be understood from FIG. 35A, if the actual temperature TC of the exhaust purification catalyst 13 is higher than the reference temperature TCi, the correction value KP becomes larger than 1.0, so the injection pressure is made higher, while if the actual temperature TC of the exhaust purification catalyst 13 is lower than the reference temperature TCi, the correction value KP becomes smaller than 1.0, so the injection pressure is made lower. Further, as will be understood from FIG. 35B, if the actual temperature TC of the exhaust purification catalyst 13 is higher than the reference temperature TCi, the correction value KT becomes smaller than 1.0, so the injection time is made shorter, while if the actual temperature TC of the exhaust purification catalyst 13 is lower than the reference temperature TCi, the correction value KT becomes larger than 1.0, so the injection time is made longer. The relationships shown in FIG. 35A and FIG. 35B are stored in advance in the ROM 32.

Figure 36:
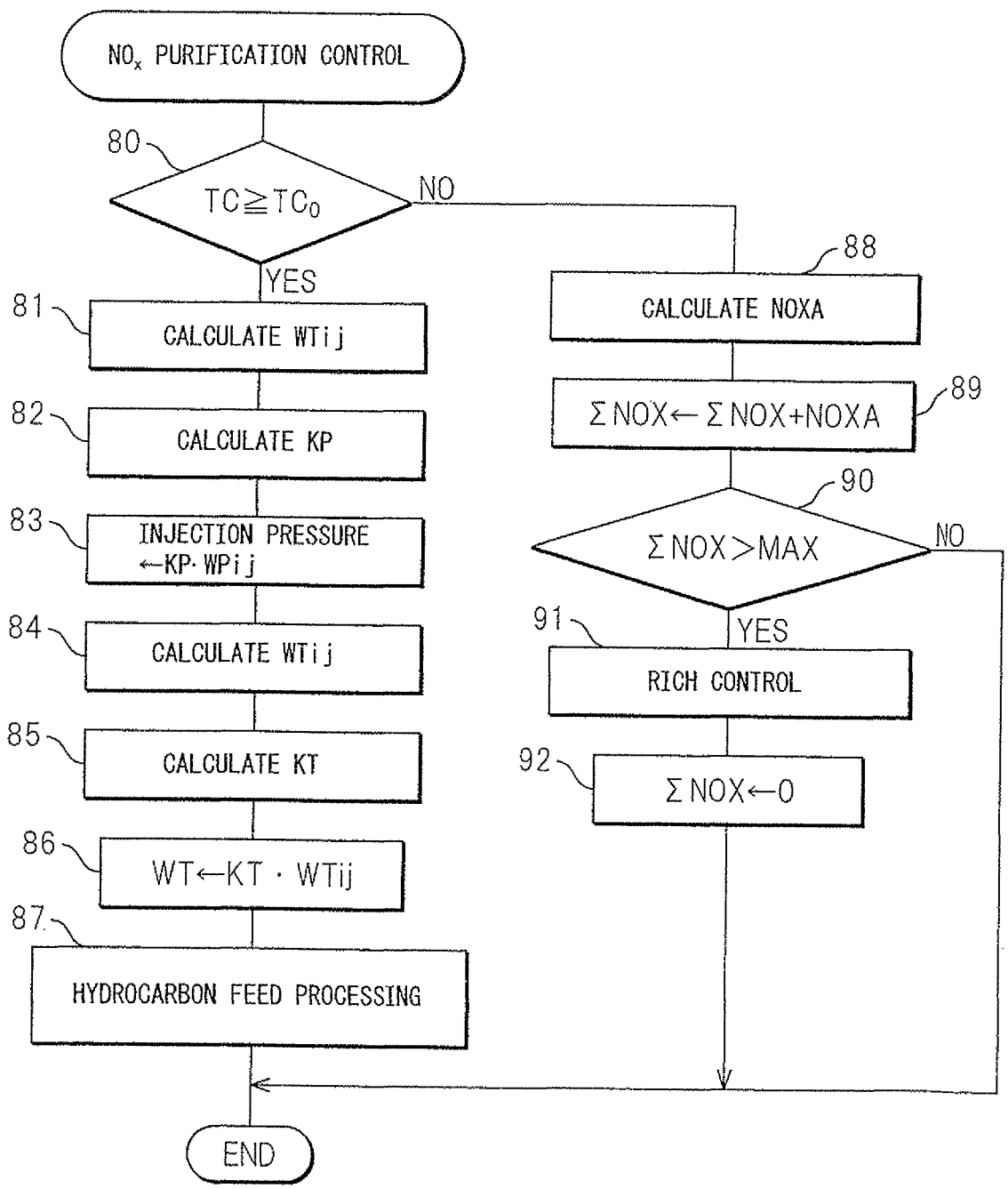
FIG. 36 is a flow chart for $NO_x$ purification control.

FIG. 36 shows an $NO_x$ purification control routine for execution of the second embodiment. This routine is executed by interruption every predetermined time.

Referring to FIG. 36, first, at step 80, it is judged from the output signal of the temperature sensor 23 if the temperature TC of the exhaust purification catalyst 13 exceeds the activation temperature $TC_0$. When $TC \geq TC_0$, that is, when the exhaust purification catalyst 13 is activated, the routine proceeds to step 81 where the $NO_x$ purification action by the first $NO_x$ purification method is executed.

That is, first, at step 81, the reference injection pressure WPij is calculated from the map shown in FIG. 32B. Next, at step 82, the correction value KP is calculated from the relationship shown in FIG. 35A. Next, at step 83, the final target injection pressure WP(=KP·WPij) is calculated and the fuel pressure inside the high pressure fuel chamber 16, that is, the injection pressure, is made to become this target injection pressure WP by control of the pressurizing pump 17.

Next, at step 84, the reference injection time WTij is calculated from the map shown in FIG. 33B. Next, at step 85, the correction value KT is calculated from the relationship shown in FIG. 35B. Next, at step 86, the final injection time WT(=KT·WTij) is calculated. Next, at step 87, this final injection time WT is used as the basis for feed control of hydrocarbons from the hydrocarbon feed valve 15.

On the other hand, when it is judged at step 80 that $TC<TC_0$, it is judged that the second $NO_x$ purification method should be used, then the routine proceeds to step 88. At step 88, the $NO_x$ amount NOXA exhausted per unit time is calculated from the map shown in FIG. 17. Next, at step 89, $\Sigma NO_x$ is increased by the exhausted $NO_x$ amount NOXA to calculate the stored $NO_x$ amount $\Sigma NO_x$. Next, at step 90, it is judged if the stored $NO_x$ amount $\Sigma NO_x$ exceeds the allowable value MAX. When $\Sigma NO_x$>MAX, the routine proceeds to step 91 where the additional fuel amount WR is calculated from the map shown in FIG. 19 and the injection action of additional fuel is performed. Next, at step 92, $\Sigma NO_x$ is cleared.

As will be understood from the explanation up to here, according to the present invention, at the time of engine operation, at least one of the injection time and injection pressure of hydrocarbons from the hydrocarbon feed valve 15 is controlled so that the amplitude of the change of the concentration of hydrocarbons flowing into the exhaust purification catalyst 13 becomes within the predetermined range of amplitude, the injection period of hydrocarbons from the hydrocarbon feed valve 15 is controlled so that the concentration of hydrocarbons flowing into the exhaust purification catalyst 13 vibrates within the predetermined range of period, when only the injection time of hydrocarbons is controlled, the injection time of hydrocarbons under the same engine operating state is made longer the higher the temperature TC of the exhaust purification catalyst 13, and, when the injection pressure of hydrocarbons is controlled, the injection pressure of hydrocarbons under the same engine operating state is made higher the higher the temperature TC of the exhaust purification catalyst 13.

Note that, in this embodiment according to the present invention, when the injection pressure of hydrocarbons is controlled, the injection time of hydrocarbons under the same engine operating state is made shorter the higher the temperature of the exhaust purification catalyst 13.

Further, explaining the present invention in a bit more detail, at least one of the injection time and injection pressure of hydrocarbons able to give an amplitude of change of the concentration of hydrocarbons flowing into the exhaust purification catalyst 13 at the time of steady operation of the engine within the predetermined range of amplitude is stored in advance as the reference injection time WTij or reference injection pressure WPij for each operating state of the engine. The temperature of the exhaust purification catalyst 13 at the steady operation state of the engine is stored in advance as the reference temperature TCi for each operating state of the engine. If only the injection time of hydrocarbons is controlled at the time of engine operation, when the temperature of the exhaust purification catalyst 13 becomes higher than the reference temperature TCi in accordance with the engine operating state, the injection time of hydrocarbons is made longer than the reference injection time WTij in accordance with the engine operating state. If the injection pressure of hydrocarbons is controlled at the time of engine operation, when the temperature of the exhaust purification catalyst 13 becomes higher than the reference temperature TCi in accordance with the engine operating state, the injection pressure of hydrocarbons is made higher than the reference injection pressure WPij in accordance with the engine operating state.

Note that, in this case, in case where the injection pressure of hydrocarbons is controlled, when the temperature of the exhaust purification catalyst 13 becomes higher than the reference temperature TCi in accordance with the engine operating state, the injection time of hydrocarbons is made shorter than the reference injection time WTi in accordance with the engine operating state.

Note that, when only the injection timing of hydrocarbons is controlled at the time of engine operation, as shown in FIG. 25A, the injection timing of the hydrocarbons at the time of engine high load operation is made lower than at the time of engine low load operation. As opposed to this, when the injection pressure of hydrocarbons is controlled at the time of engine operation, as shown in FIG. 32A, the injection pressure of hydrocarbons at the time of engine high load operation is made higher than at the time of engine low load operation.

Note that, as another embodiment, in the engine exhaust passage upstream of the exhaust purification catalyst 13, an oxidation catalyst for reforming the hydrocarbons can be arranged.

REFERENCE SIGNS LIST

4 . . . intake manifold
5 . . . exhaust manifold
7 . . . exhaust turbocharger
12 . . . exhaust pipe
13 . . . exhaust purification catalyst
14 . . . particulate filter
15 . . . hydrocarbon feed valve

The invention claimed is:
1. An exhaust purification system of an internal combustion engine comprising:
 an engine exhaust gas passage;
 a hydrocarbon feed valve for feeding hydrocarbons arranged inside of the engine exhaust passage;
 an exhaust purification catalyst for reacting $NO_x$ contained in exhaust gas and reformed hydrocarbons arranged inside of the engine exhaust passage downstream of the hydrocarbon feed valve;

a precious metal catalyst carried on an exhaust gas flow surface of the exhaust purification catalyst;

a basic exhaust gas flow surface part formed around the precious metal catalyst; and an electronic control unit, wherein the electronic control unit is configured to control a vibration of a concentration of hydrocarbons flowing into the exhaust purification catalyst within a predetermined range of amplitude and within a predetermined range of period, and is configured to control the vibration period of the hydrocarbon concentration longer than the predetermined range of period, wherein when the electronic control unit controls the vibration of the concentration of hydrocarbons flowing into the exhaust purification catalyst within the predetermined range of amplitude and within the predetermined range of period, a reducing intermediate containing nitrogen and hydrocarbons is produced on the precious metal catalyst and is held on the basic exhaust gas flow surface part, the $NO_x$ that is contained in the exhaust gas is chemically reduced by a reducing action of the reducing intermediate that is held on the basic exhaust gas flow surface part in the exhaust purification catalyst, and the exhaust purification catalyst has a property of chemically reducing the $NO_x$ that is contained in the exhaust gas without storing, or storing a fine amount of nitrates in the basic exhaust gas flow surface part, when the electronic control unit controls the vibration period of the hydrocarbon concentration longer than the predetermined range of period, the exhaust purification catalyst has a property of being increased in storage amount of $NO_x$ that is contained in exhaust gas, the electronic control unit is configured to control at least one of an injection time and/or an injection pressure of hydrocarbons from the hydrocarbon feed valve so that an amplitude of a change of the concentration of hydrocarbons flowing into the exhaust purification catalyst becomes within the predetermined range of amplitude, and is configured to control an injection period of hydrocarbons from the hydrocarbon feed valve so that the concentration of hydrocarbons flowing into the exhaust purification catalyst vibrates within the predetermined range of period, wherein when the electronic control unit is controlling only the injection time of the hydrocarbons, the injection time of the hydrocarbons, under a same engine operating state, is made longer the higher a temperature of the exhaust purification catalyst becomes, and when the electronic control unit is controlling the injection pressure of the hydrocarbons, the injection pressure of the hydrocarbons, under a same engine operating state, is made higher the higher the temperature of the exhaust purification catalyst becomes.

2. The exhaust purification system of an internal combustion engine as claimed in claim 1, wherein when the electronic control unit is controlling the injection pressure of the hydrocarbons, the injection time of the hydrocarbons, under a same engine operating state, is made shorter the higher the temperature of the exhaust purification catalyst becomes.

3. The exhaust purification system of an internal combustion engine as claimed in claim 1, wherein a configuration of the electronic control unit controlling the at least one of the injection time and/or the injection pressure of the hydrocarbons that changes the amplitude of the concentration of hydrocarbons flowing into the exhaust purification catalyst at a time of steady operation of the engine to be within the predetermined range of amplitude is stored in advance as a reference injection time and/or as a reference injection pressure for each operating state of the engine, the temperature of the exhaust purification catalyst at the steady operation state of the engine is stored in advance as a reference temperature for each operating state of the engine, if the electronic control unit controls only the injection time of hydrocarbons, when the temperature of the exhaust purification catalyst becomes higher than the reference temperature, the injection time of hydrocarbons is made longer than the reference injection time, and if the electronic control unit is controlling the injection pressure of hydrocarbons, when the temperature of the exhaust purification catalyst becomes higher than the reference temperature, the injection pressure of hydrocarbons is made higher than the reference injection pressure.

4. The exhaust purification system of an internal combustion engine as claimed in claim 3, wherein if the electronic control unit is controlling the injection pressure of the hydrocarbons, when the temperature of the exhaust purification catalyst becomes higher than the reference temperature, the injection time of the hydrocarbons is made shorter than the reference temperature.

5. The exhaust purification system of an internal combustion engine as claimed in claim 1, wherein when the electronic control unit is controlling only the injection time of the hydrocarbons, the injection time of the hydrocarbons at a time of engine high load operation is made longer than at a time of engine low load operation, and when the electronic control unit is controlling the injection pressure of the hydrocarbons, the injection pressure of hydrocarbons at a time of engine high load operation is made higher than at a time of engine low load operation.

6. The exhaust purification system of an internal combustion engine as claimed in claim 1, wherein the predetermined vibration period of the hydrocarbon concentration is the vibration period necessary for continued production of the reducing intermediate.

7. The exhaust purification system of an internal combustion engine as claimed in claim 6, wherein the vibration period of the hydrocarbon concentration is 0.3 second to 5 seconds.

8. The exhaust purification system of an internal combustion engine as claimed in claim 1, wherein the precious metal catalyst is comprised of platinum (Pt) and at least one of rhodium (Rh) and/or palladium (Pd).

9. The exhaust purification system of an internal combustion engine as claimed in claim 1, wherein a basic layer containing an alkali metal, an alkali earth metal, a rare earth, or a metal that can donate electrons to $NO_x$ is formed on the exhaust gas flow surface of the exhaust purification catalyst and wherein a surface of the basic layer forms the basic exhaust gas flow surface part.

* * * * *